(12) United States Patent
Cleaver et al.

(10) Patent No.: US 11,322,032 B2
(45) Date of Patent: May 3, 2022

(54) APPARATUS, METHOD AND SYSTEM RELATING TO AIRCRAFT SYSTEMS

(71) Applicant: UNIVERSITY OF BATH, Bath and Northeast Somerset (GB)

(72) Inventors: David Cleaver, Bath (GB); Jonathan Du Bois, Bristol (GB); Pejman Iravani, Bradford on Avon (GB); Anthony Lawrenson, Bath (GB)

(73) Assignee: UNIVERSITY OF BATH, Bath and Northeast Somerset (GB)

( * ) Notice: Subject to any disclaimer, the term of this patent is extended or adjusted under 35 U.S.C. 154(b) by 292 days.

(21) Appl. No.: 16/462,003

(22) PCT Filed: Nov. 10, 2017

(86) PCT No.: PCT/GB2017/053403
§ 371 (c)(1),
(2) Date: May 17, 2019

(87) PCT Pub. No.: WO2018/091870
PCT Pub. Date: May 24, 2018

(65) Prior Publication Data
US 2019/0325756 A1 Oct. 24, 2019

(30) Foreign Application Priority Data
Nov. 17, 2016 (GB) ...................................... 1619473

(51) Int. Cl.
*G01C 17/38* (2006.01)
*G08G 5/00* (2006.01)
(Continued)

(52) U.S. Cl.
CPC ........... *G08G 5/0034* (2013.01); *G06T 7/246* (2017.01); *G06T 17/05* (2013.01); *G08G 5/04* (2013.01);
(Continued)

(58) Field of Classification Search
CPC ........ G08G 5/0034; G08G 5/04; G06T 7/246; G06T 17/05; G06T 2207/20076; G06T 2207/30241
(Continued)

(56) References Cited

U.S. PATENT DOCUMENTS 4,377,848 A * 3/1983 Flannigan ............ G05D 1/0607
244/180
5,408,413 A * 4/1995 Gonser ................ G05D 1/0005
244/182
(Continued)

OTHER PUBLICATIONS

International Search Report and Written Opinion of the International Searching Authority, International Application No. PCT/GB2017/053403, dated Apr. 5, 2018.
(Continued)

*Primary Examiner* — Mahmoud S Ismail
(74) *Attorney, Agent, or Firm* — Jackson Walker L.L.P.

(57) ABSTRACT

A method for determining a flight path for an aircraft system, for example an unmanned aircraft system (UAS) comprises analysing an intensity map relating to a three dimensional space. The intensity map comprises an array of voxels, each voxel defining a volume in the three dimensional space, and each voxel having a related traffic intensity value based on historical flight data through that voxel. The method comprises determining a probability of an encounter for a preferred flight path between a start point and an end point via one or more voxels in the three dimensional space, based on traffic intensity values of the one or more voxels along the preferred flight path. The preferred flight path is selected if the probability of encounter is less than a first threshold value.

20 Claims, 25 Drawing Sheets

(51) Int. Cl.
*G06T 7/246* (2017.01)
*G06T 17/05* (2011.01)
*G08G 5/04* (2006.01)

(52) U.S. Cl.
CPC .............. *G06T 2207/20076* (2013.01); *G06T 2207/30241* (2013.01)

(58) Field of Classification Search
USPC ......................................................... 701/528
See application file for complete search history.

(56) References Cited

U.S. PATENT DOCUMENTS

| | | | | |
|---|---|---|---|---|
| 5,408,473 | A * | 4/1995 | Hutchison | H03M 9/00 370/506 |
| 6,085,147 | A | 7/2000 | Myers | |
| 6,201,482 | B1 | 3/2001 | Schiefele et al. | |
| 7,194,353 | B1 * | 3/2007 | Baldwin | G08G 5/0013 701/528 |
| 9,262,929 | B1 * | 2/2016 | Roy | G06Q 10/047 |
| 9,417,070 | B1 | 8/2016 | Herriot | |
| 2005/0173594 | A1 | 8/2005 | Viebahn et al. | |
| 2009/0105935 | A1 | 4/2009 | Jha et al. | |
| 2013/0080043 | A1 | 3/2013 | Ballin et al. | |
| 2013/0124089 | A1 * | 5/2013 | Herman | G08G 5/0021 701/528 |
| 2013/0231803 | A1 | 9/2013 | Barraci et al. | |
| 2014/0156109 | A1 | 6/2014 | Estkowski | |
| 2014/0309817 | A1 * | 10/2014 | Burgin | G08G 5/0021 701/3 |
| 2015/0228196 | A1 | 8/2015 | Sampigethaya | |
| 2016/0140851 | A1 * | 5/2016 | Levy | G08G 5/045 701/3 |
| 2016/0217694 | A1 | 7/2016 | Batla et al. | |
| 2018/0020081 | A1 * | 1/2018 | Teague | H04W 24/00 |
| 2018/0082597 | A1 * | 3/2018 | Nicol | G08G 5/0043 |
| 2018/0082897 | A1 * | 3/2018 | Agari | B23K 26/53 |

OTHER PUBLICATIONS

Combined Search and Examination Report under Sections 17 and 18(3), UKIPO, Application No. GB1619473.0, dated May 11, 2017.
Communication Pursuant to ARticle 94(3) EPC, Application No. 17 798 300.4, dated Oct. 29, 2021.

* cited by examiner

APPARATUS, METHOD AND SYSTEM RELATING TO AIRCRAFT SYSTEMS

TECHNICAL FIELD

The embodiments described herein relate to an apparatus, method and system relating to aircraft systems, and in particular to an apparatus, method and system for determining flight paths for aircraft systems, for example unmanned aircraft systems.

BACKGROUND

Unmanned aircraft systems (UASs, also commonly known as "drones") are becoming increasing popular for a variety of applications, including for example surveillance operations or the delivery of objects to remote locations.

An obstacle to the wide use of unmanned aircraft systems is the integration of such unmanned aircraft systems into national airspace. The main concern being the risk of collisions with other manned aircraft. Currently in the United Kingdom regulations prohibit the use of unmanned aircraft systems beyond a visual line of sight (referred to as BVLOS) without certification by the Civil Aviation Authority (CAA), none having yet been granted. This limits the operation of unmanned aircraft systems to within a visual line of sight, e.g. within a range of about 500 m of an operator, which severely inhibits commercial operations.

SUMMARY

It is an aim of the embodiments described herein to provide a method, apparatus and system which obviate or reduce at least one or more of the disadvantages mentioned above.

According to a first aspect of the present invention there is provided a method for determining a flight path for an aircraft system. The method comprises analysing an intensity map relating to a three dimensional space, wherein the intensity map comprises an array of voxels, each voxel defining a volume in the three dimensional space, and each voxel having a related traffic intensity value based on historical flight data through that voxel. The method comprises determining a probability of an encounter for a preferred flight path between a start point and an end point via one or more voxels in the three dimensional space, based on traffic intensity values of the one or more voxels along the preferred flight path. The method comprises selecting the preferred flight path if the probability of encounter is less than a first threshold value.

According to another aspect of the present invention there is provided an aircraft system comprising a processor and a memory, said memory containing instructions executable by said processor. The aircraft system is operative to analyse an intensity map relating to a three dimensional space, wherein the intensity map comprises an array of voxels, each voxel defining a volume in the three dimensional space, and each voxel having a related traffic intensity value based on historical flight data through that voxel. The aircraft system is further operative to determine a probability of an encounter for a preferred flight path between a start point and an end point via one or more voxels in the three dimensional space, based on traffic intensity values of the one or more voxels along the preferred flight path. The aircraft system is further operative to select the preferred flight path if the probability of encounter is less than a first threshold value.

According to another aspect, there is provided a flight control system for controlling an aircraft system, the flight control system comprising a processor and a memory, said memory containing instructions executable by said processor. The flight control system is operative to analyse an intensity map relating to a three dimensional space, wherein the intensity map comprises an array of voxels, each voxel defining a volume in the three dimensional space, and each voxel having a related traffic intensity value based on historical flight data through that voxel. The flight control system is further operative to determine a probability of an encounter for a preferred flight path between a start point and an end point via one or more voxels in the three dimensional space, based on traffic intensity values of the one or more voxels along the preferred flight path. The flight control system is further operative to select the preferred flight path if the probability of encounter is less than a first threshold value.

According to another aspect, there is provided a method for assessing a risk associated with a flight path for an aircraft system. The method comprises analysing an intensity map relating to a three dimensional space, wherein the intensity map comprises an array of voxels, each voxel defining a volume in the three dimensional space, and each voxel having a related traffic intensity value based on historical flight data through that voxel. The method comprises determining a probability of an encounter for a preferred flight path between a start point and an end point via one or more voxels in the three dimensional space, based on traffic intensity values of the one or more voxels along the preferred flight path. The method comprises assessing the risk associated with the preferred flight path based on the determined probability of encounter.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 1:
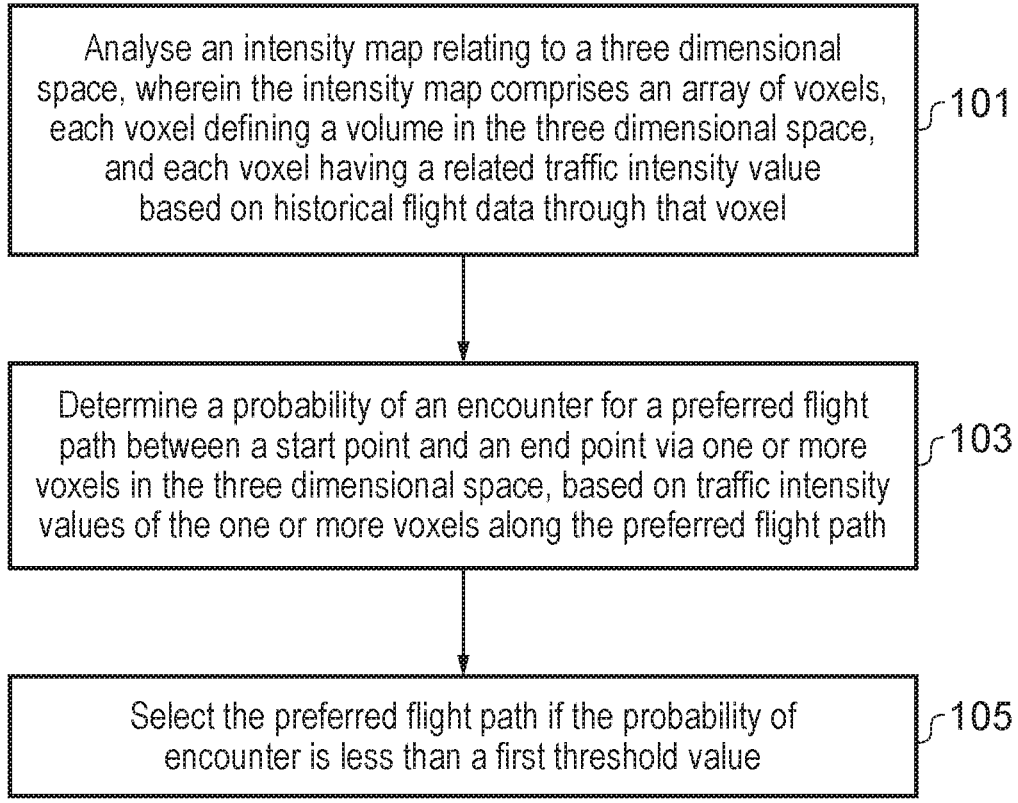
FIG. 1 shows an example of a method according to an embodiment.

The following sets forth specific details, such as particular embodiments for purposes of explanation and not limitation. But it will be appreciated by one skilled in the art that other embodiments may be employed apart from these specific details. In some instances, detailed descriptions of well known methods, processes and devices are omitted so as not to obscure the description with unnecessary detail. Those skilled in the art will appreciate that the functions described may be implemented in one or more apparatus or nodes using hardware circuitry (e.g., analog and/or discrete logic gates interconnected to perform a specialized function, ASICs, PLAs, etc.) and/or using software programs and data in conjunction with one or more digital microprocessors or general purpose computers. Apparatus or nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed, with some or all the computing functions being cloud based. Moreover, these terms also refer to other hardware capable of performing such functions and/or executing software, such as the example hardware recited above.

References herein will be made to the term "aircraft system", which is intended to embrace both unmanned aircraft systems (UASs) and manned aircraft systems.

References will also be made herein to the term "voxel", which is used to represent a volume in three-dimensional space. A three dimensional array of voxels can therefore be used to represent a larger three-dimensional space, each particular voxel referring to a point, volume or region in that three-dimensional space.

It is noted that a voxel may comprise any shape, including for example rectangular, cuboid, spherical or tetrahedral shapes. Different voxels in an array may have the same shape, or may have different shapes, or a combination thereof. Voxels may be of any size, for example according to a desired granularity by which the three-dimensional space is to be defined. Different voxels in an array may have the same size, or may have different sizes, or a combination thereof.

It is further noted that individual voxels in the array of voxels may be adjacent or contiguous, such that every particular point in the three dimensional space falls within a particular voxel. Alternatively, individual voxels may be spaced apart or non-contiguous.

FIG. 1 shows an example of a method for determining a flight path for an aircraft system, for example an unmanned aircraft system (UAS), according to a first embodiment. The method comprises analysing an intensity map relating to a three dimensional space, wherein the intensity map comprises an array of voxels, each voxel defining a volume in the three dimensional space, and each voxel having a related traffic intensity value based on historical flight data through that voxel, step 101.

The method comprises determining a probability of an encounter for a preferred flight path between a start point and an end point via one or more voxels in the three dimensional space, based on traffic intensity values of the one or more voxels along the preferred flight path, step 103. The preferred flight path may comprise, for example, a flight path along a direct line of sight between the start point and end point.

The method comprises selecting the preferred flight path if the probability of encounter is less than a first threshold value, step 105.

By selecting a flight path according to an intensity map based on historical traffic, this enables a flight path to be selected with an acceptable probability of an encounter.

Figure 2A:
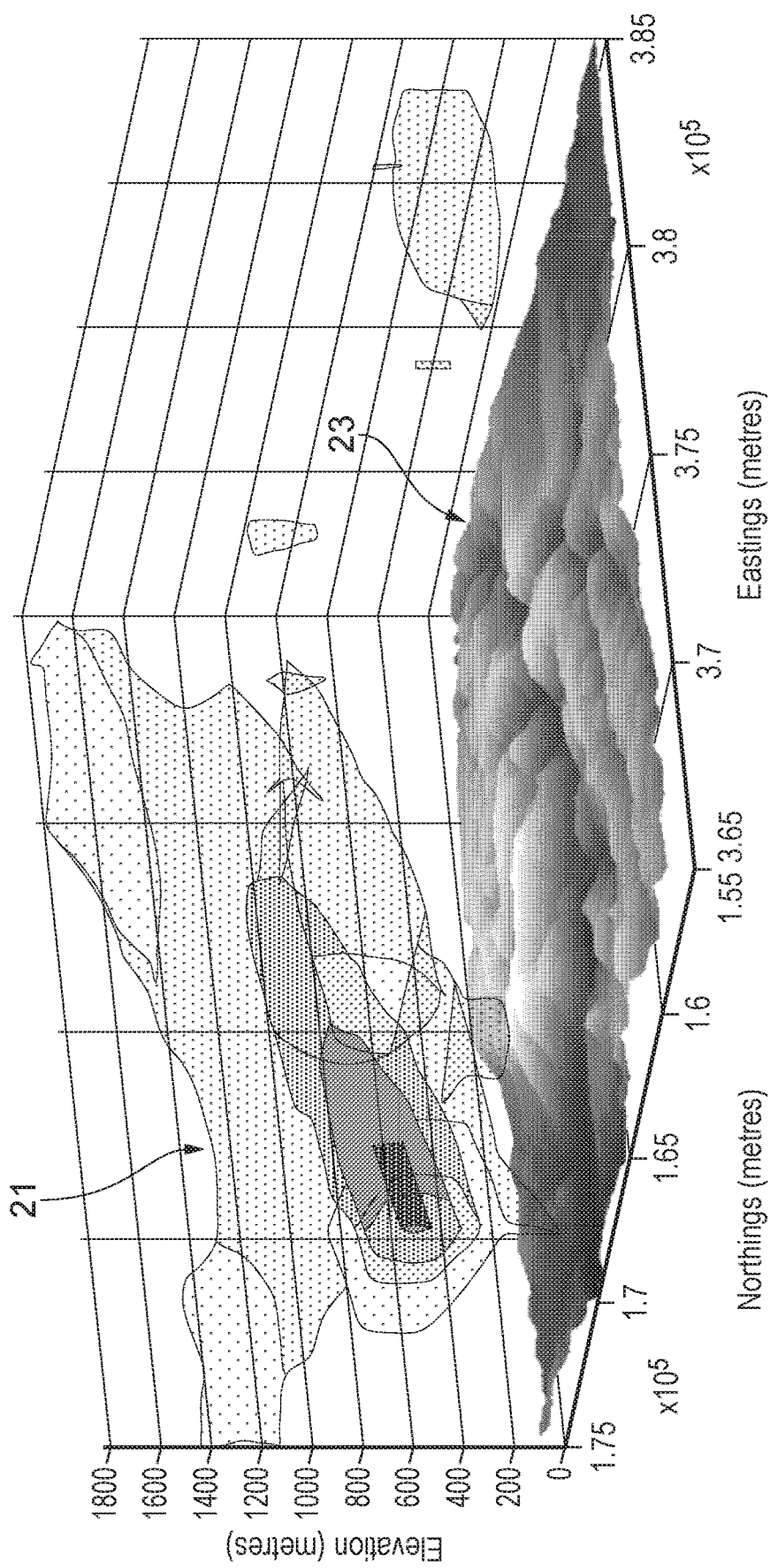
FIGS. 2a to 2c show an example of an intensity map for use with an embodiment.

FIG. 2a shows an example of a perspective view of an intensity map 21 relating to a three dimensional space between the cities of Bath and Bristol, relating to historical aircraft traffic for Bristol Airport. In this example the intensity map represents historical traffic over a period of 16 days, although it will be appreciated that the historical data for the intensity map can be gathered over any period of time.

Due to the scale of the intensity map individual voxels are not shown per se. However, the traffic intensity values of different voxels making up the three dimensional space are illustrated in grey scale, whereby the darker the image the higher the traffic intensity value. In other words, darker areas represent the fact that more aircraft have passed through those areas (voxels) during the period over which historical data has been gathered.

In the example of FIG. 2a, the intensity map 21 also comprises terrain data 23, whereby one or more voxels represent underlying terrain of the three dimensional space, i.e. rather than traffic density for voxels representing airspace, which as will be described later can be used to provide minimum safe altitudes when determining a flight path. It is noted that the terrain data 23 may be omitted from the intensity map in some embodiments.

Figure 2B:
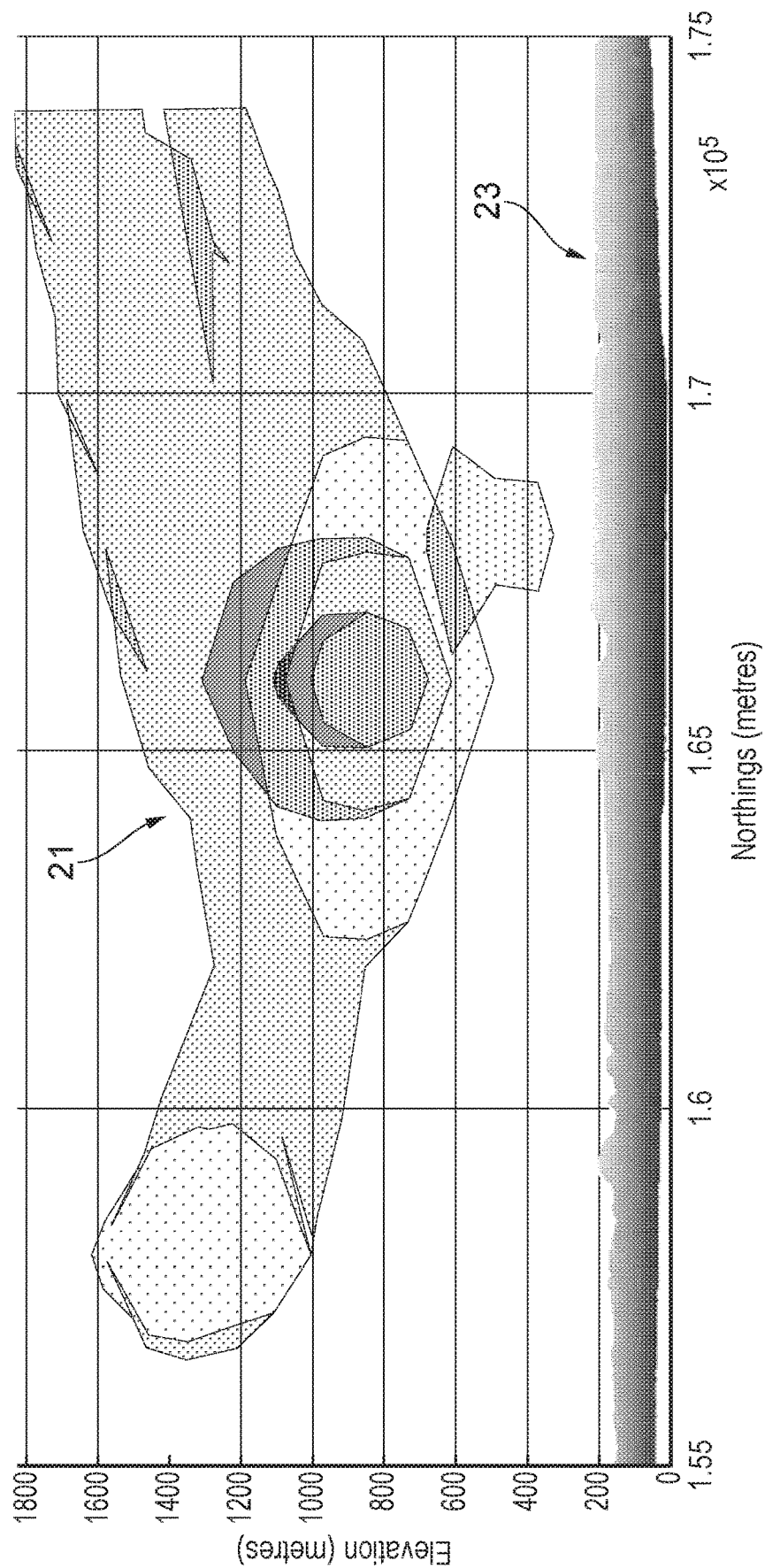
Figure 2C:
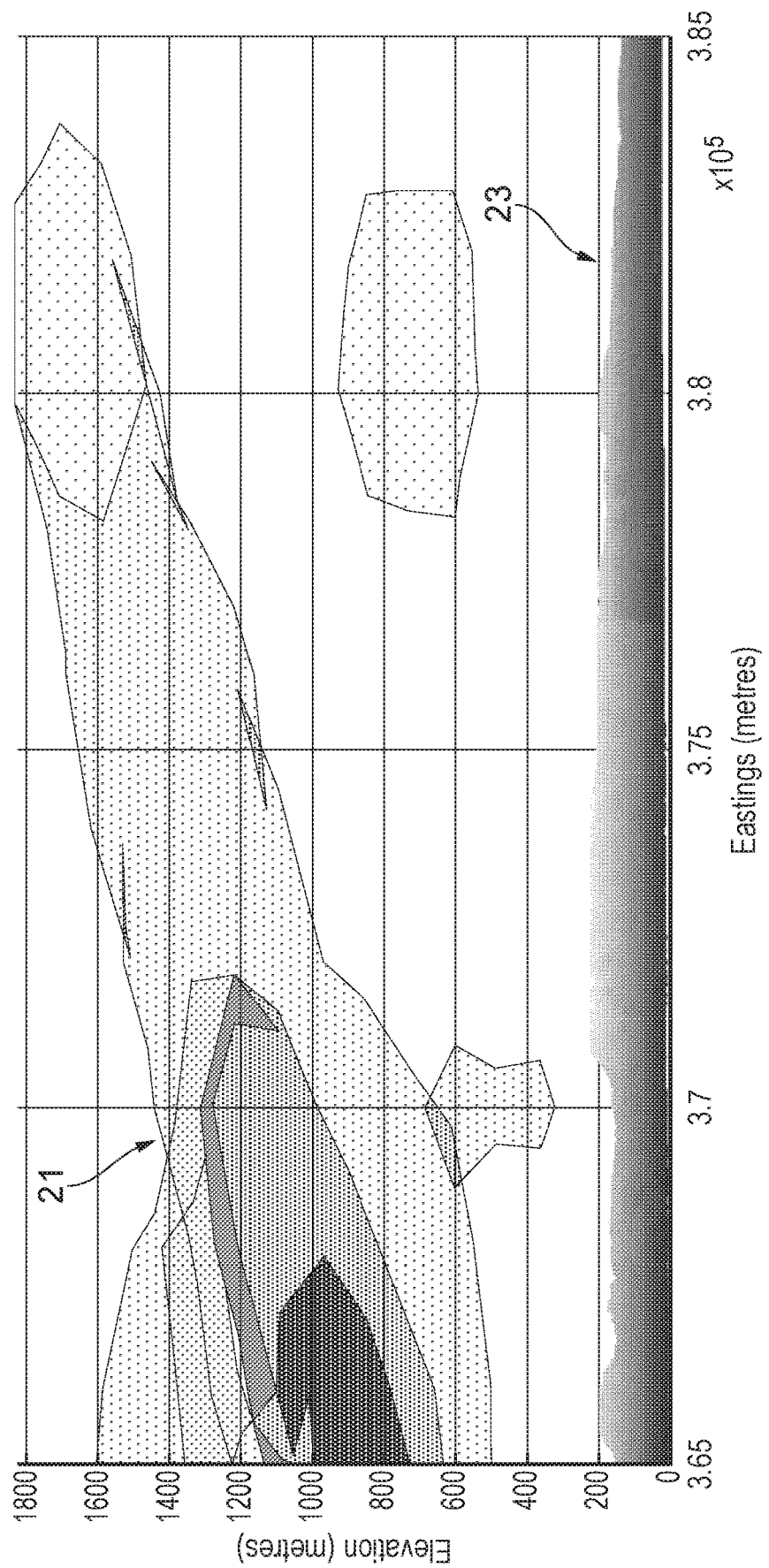

FIG. 2b shows a side view of the intensity map 21 from a north side, and FIG. 2c a side view of the intensity map from an East side. It is noted that in FIGS. 2a to 2c (and other Figures below) the z-scale is stretched 5:1 to emphasize altitude.

Figure 3A:
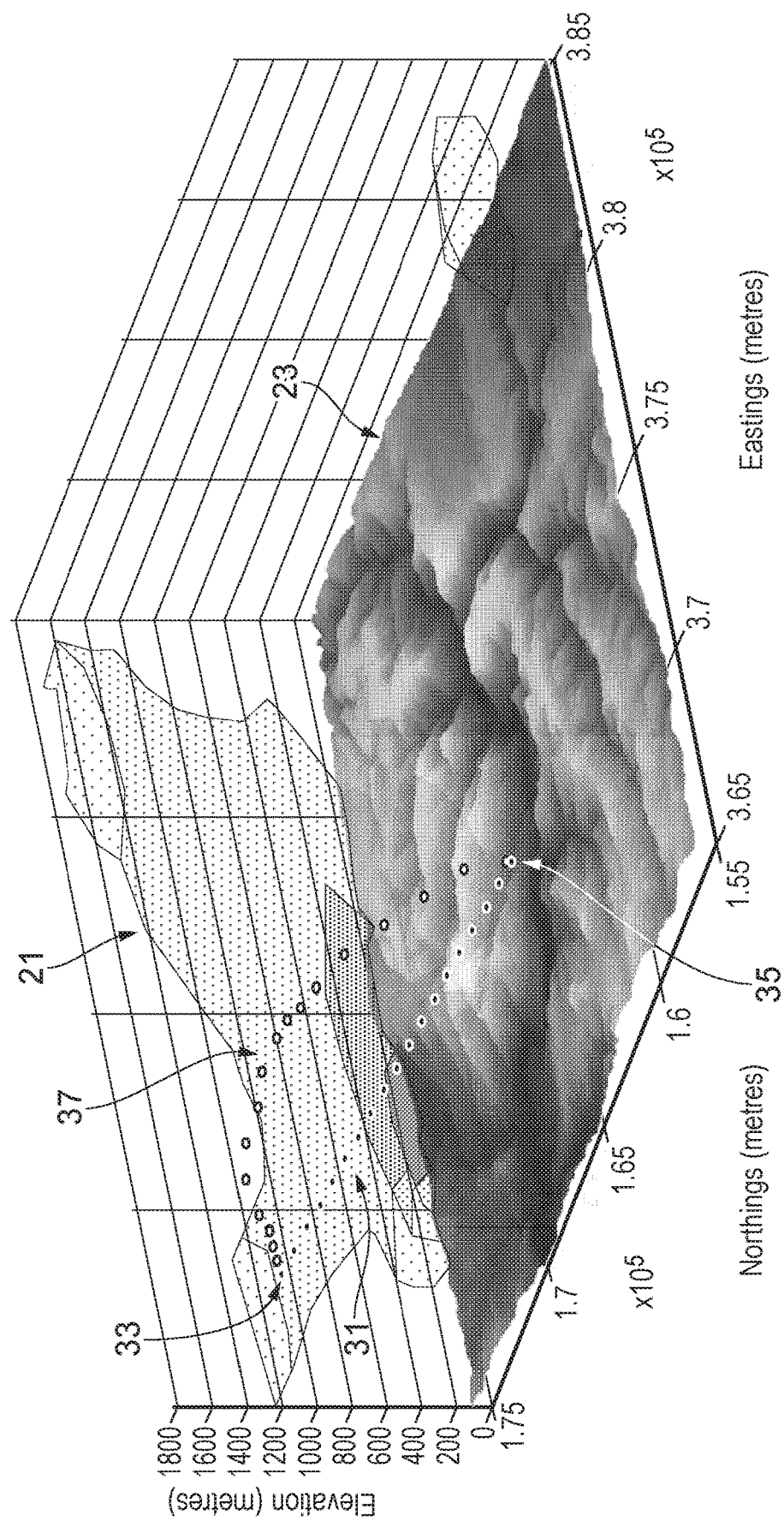
FIGS. 3a to 3c show an example of a flight path selection according to an embodiment.

FIG. 3a shows an example of how a flight path is determined according to an embodiment. FIG. 3a illustrates a preferred flight path 31 of an aircraft system (not shown), for example an unmanned aircraft system, through a three dimensional space, the preferred flight path 31 being between a start point 33 and an end point 35. The preferred flight path 31 in this example comprises a flight path along a direct line of sight between the start point 33 and the end point 35.

As described in FIG. 1 earlier, when determining a flight path of such an unmanned aircraft system, an intensity map 21 relating to the three dimensional space is analysed. This comprises analysing traffic intensity values for one or more voxels along the flight path 31, each voxel defining a volume in the three dimensional space. The traffic intensity values are based on historical flight data through the voxels, as reflected by the grey scale values in FIG. 3*a*. It is noted that a voxel can be any size and/or shape. For example, in the preferred flight path 31 shown in FIG. 3*a*, there may be several hundred or even several thousand voxels (or sections) along the flight path which are used in calculating the probability of an encounter. In one example, the voxels are cuboid in shape, for example each voxel being about 1 km×1 km, and having a height of about 75 m. It is noted smaller sized voxels can be used where greater granularity is required in the accuracy of the flight path determination.

A probability of an encounter with another aircraft, for example with a manned aircraft if the unmanned aircraft system were to travel along the preferred flight path 31 between the start point 33 and the end point 35, via a plurality of voxels in the three dimensional space therebetween, is then determined based on the intensity map 21, i.e. based on the traffic intensity values of the plurality of voxels along the preferred flight path 31.

If the probability of encounter is less than a first threshold value, then the preferred flight path 31 can be selected.

However, if the determined probability of encounter is above the first threshold value, for example as illustrated in FIG. 3*a* due to the preferred flight path 31 travelling across darker regions corresponding to how aircraft have historically travelled, for example, towards and away from Bristol airport (illustrating higher traffic intensity values), then an alternative flight path is selected between the start point 33 and the end point 35, for example the alternative flight path 37.

Figure 3B:
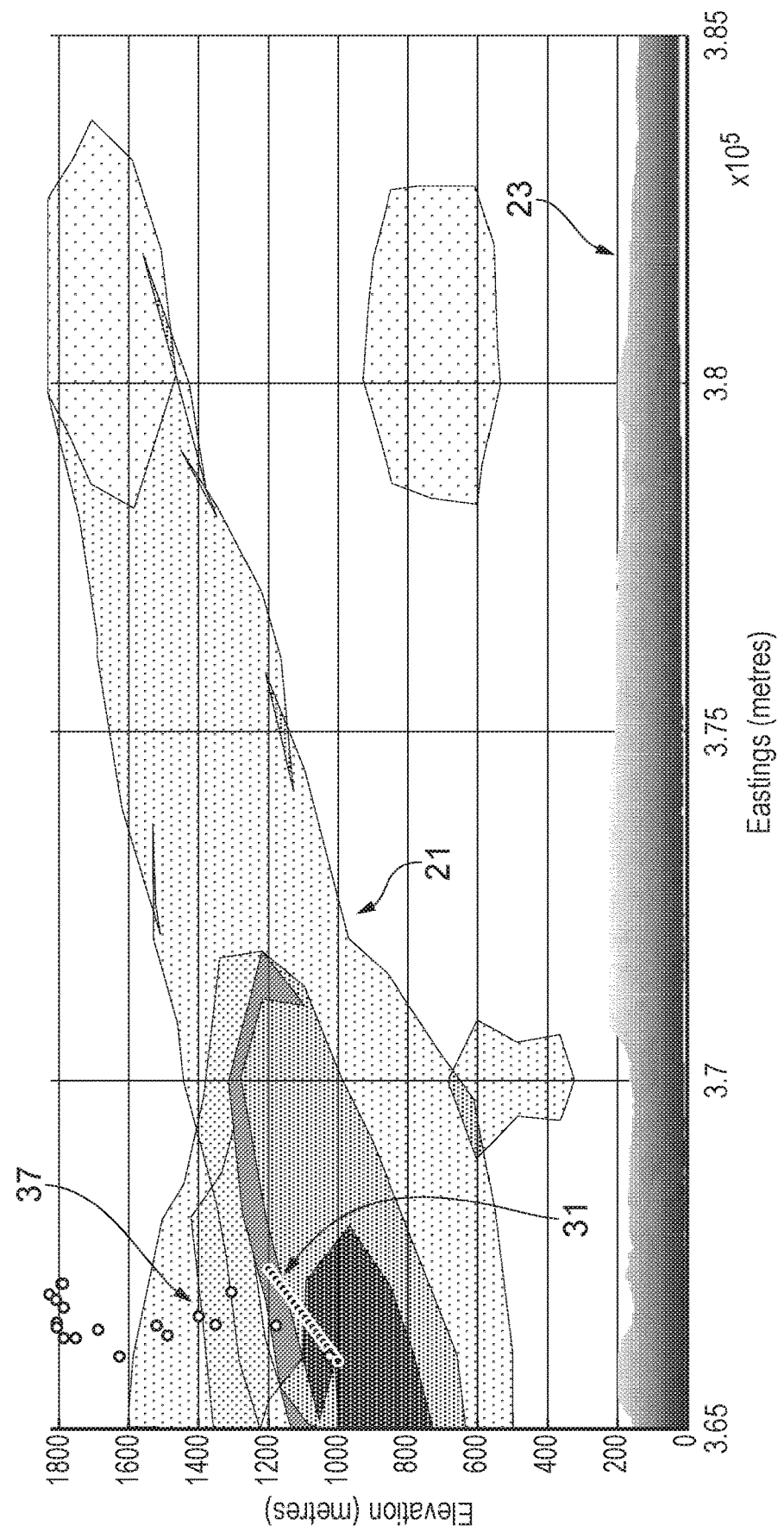
Figure 3C:
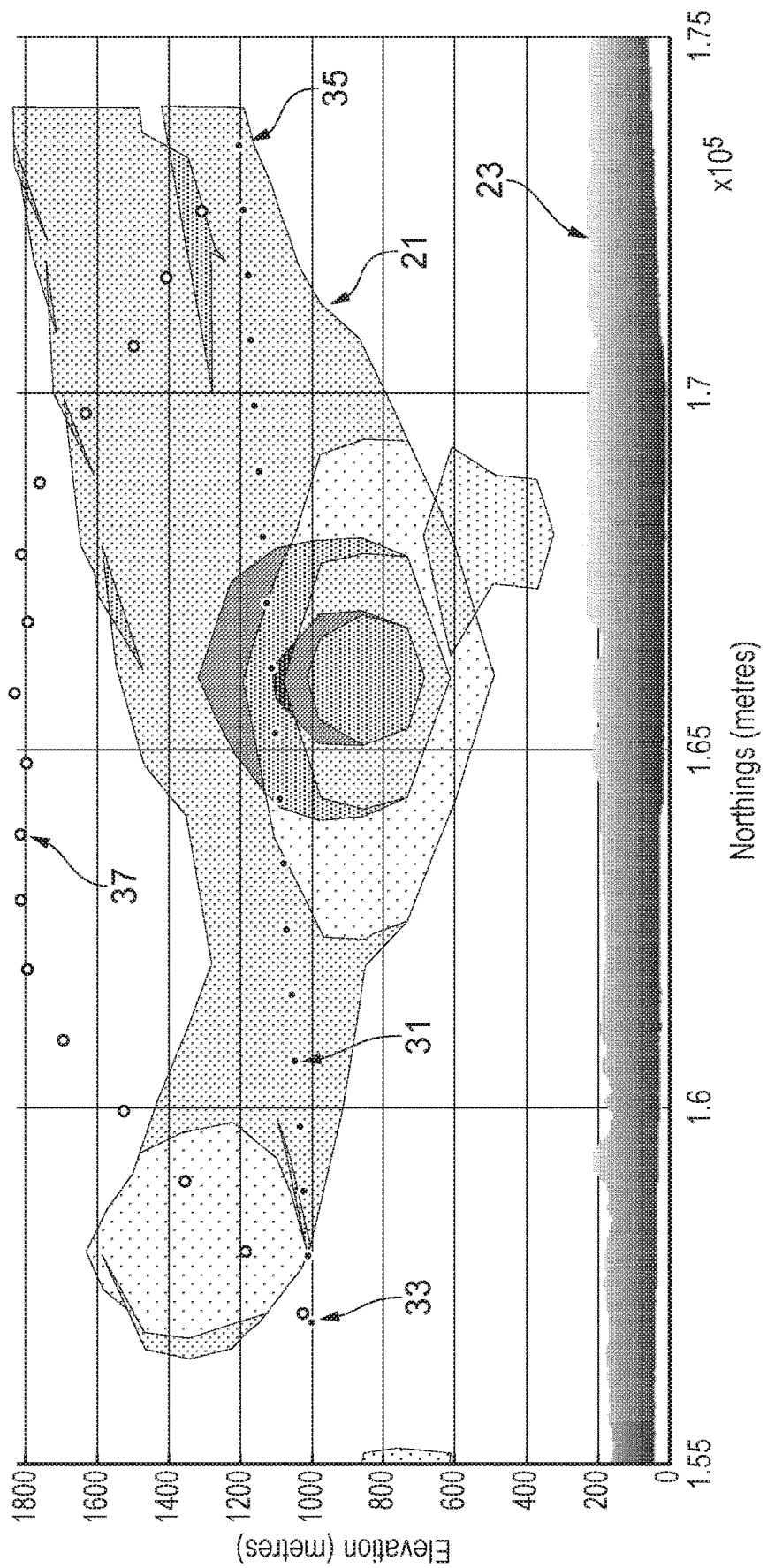

FIGS. 3*b* and 3*c* provide side views from an East side and North side respectively, which illustrate how the alternative flight path in this example predominantly involves changing altitude to avoid an area of congested airspace space or historical high traffic density. In this example the determined probability of encounter for the direct path 31 is 0.000756 for a distance of 16,531 m, versus a probability of encounter of 0.000143 for a distance of 17,132 m for the alternative path 37. As such, there is an 81% risk reduction for just a 3.6% increase in distance.

In some examples selecting an alternative flight path between the start point and end point comprises comparing the probability of encounter along two or more different flight paths between the start point 33 and the end point 35, via different voxels in the three dimensional space, and selecting a flight path which has a probability of encounter lower than the first threshold value.

In some examples, selecting an alternative flight path comprises selecting the shortest flight path which has a probability of encounter lower than the first threshold value. According to such an embodiment an acceptable level of probability of encounter is selected, but the one having the shortest flight path.

In other examples, selecting an alternative flight path comprises selecting the flight path which has the lowest overall probability of encounter. According to such an embodiment this option simply choses a flight path having the lowest probability of encounter, e.g. regardless of the distance.

In other examples, selecting an alternative flight path comprises selecting a flight path which has a zero probability of encounter, for example a shortest flight path having a zero probability of encounter. With such an embodiment the flight path is directed to areas where there have been no recorded detection of any traffic during the time period in which the intensity map is generated, i.e. whereby the historical data has no record of any previous aircraft having travelled in those areas.

Traffic intensity values forming the intensity map can be determined in different ways according to different embodiments. For example, in a simple embodiment a traffic intensity value for a particular voxel can be determined as a function of the number of aircraft that have passed somewhere through that voxel over a period of time, for example number of aircraft per minute.

Figure 3D:
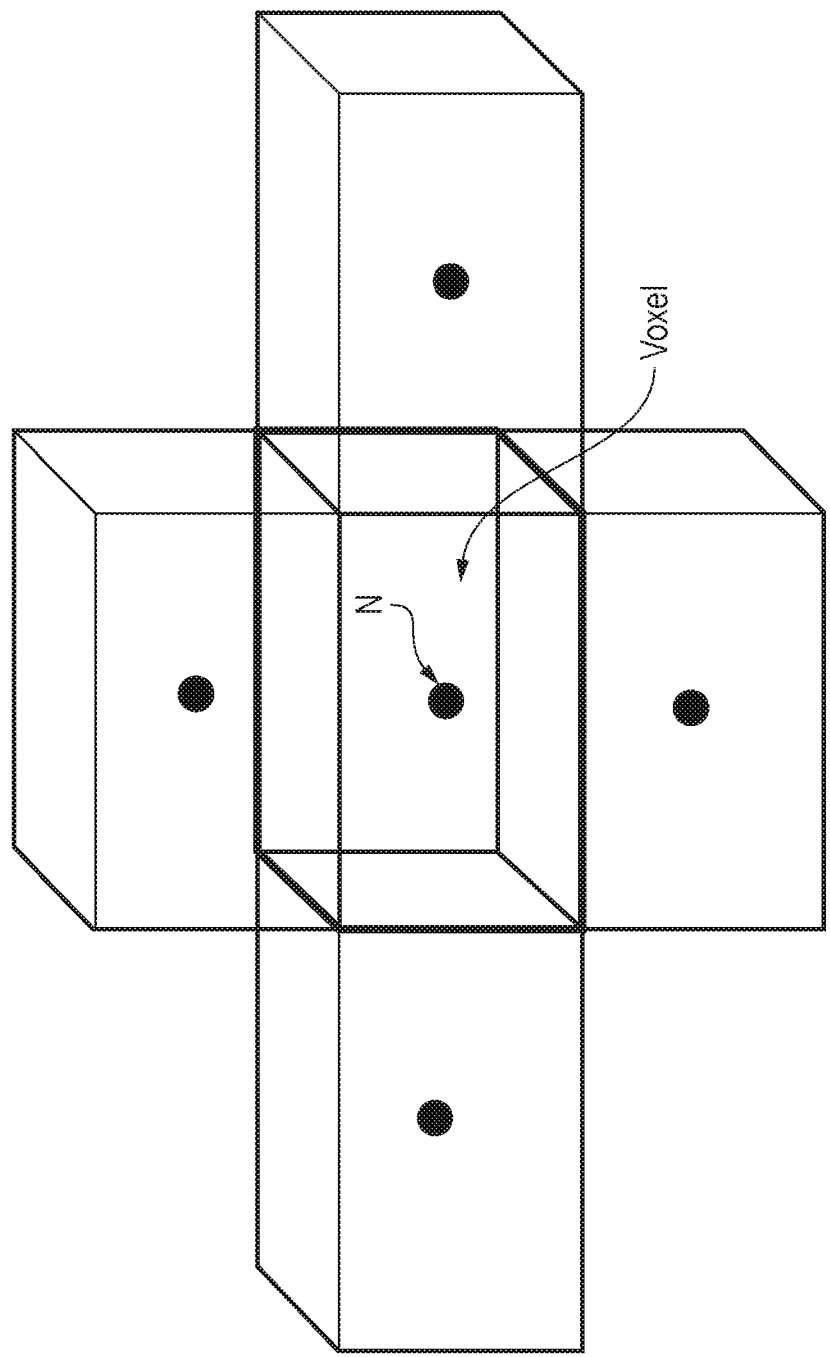
FIGS. 3d and 3e show an example of how a traffic intensity value may be determined.
Figure 3E:
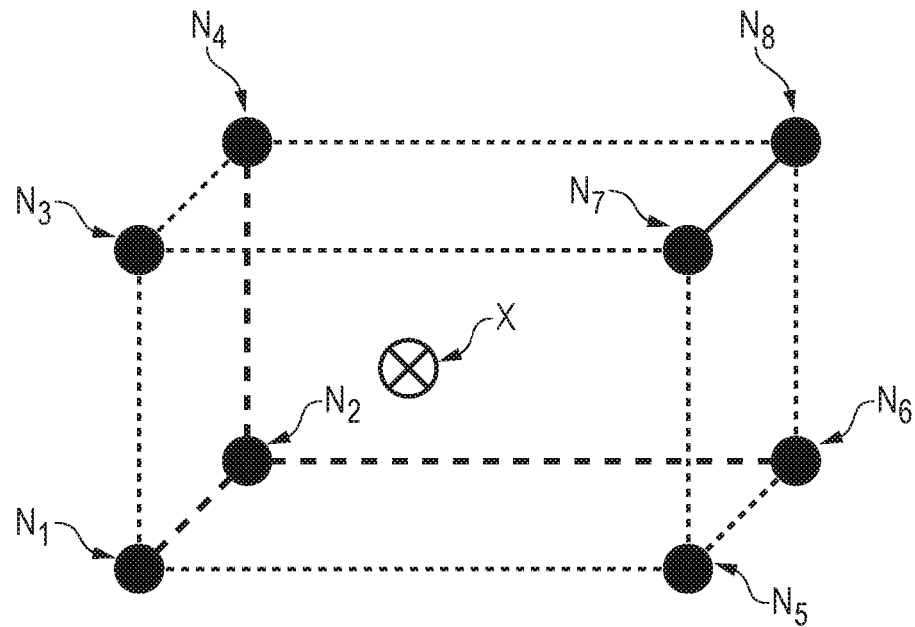

FIGS. 3*d* and 3*e* show an example of another embodiment for determining traffic intensity values for an intensity map. Referring to FIG. 3*d*, in this example the voxels are assumed to be cuboid in shape. A traffic intensity value for each of the voxels is assigned to a node N within that voxel, for example a node in the center of each voxel. In this way each voxel can be considered to have the same value of traffic intensity as its corresponding node N.

When gathering historical data to generate an intensity map, FIG. 3*e* explains how aircraft data taken from an aircraft at a particular time at a particular point X in space, is assigned to voxels. FIG. 3*e* shows a plurality of nodes $N_1$ to $N_8$ representing respective voxels (with the cuboid voxels themselves omitted for clarity).

Aircraft data is acquired at a selected rate, for example once per minute (which may be chosen, for example, to correspond to the rate at which an aircraft transmits information relating to its position, e.g. once per minute). The probability from each aircraft is distributed across the array of voxels (voxel mesh) according to the distance between the aircraft and the nearest N nodes that represent the nearest N voxels. For example, distributing the probability to N=8 nodes provides a mathematically rigorous solution, although it is noted that N>8 is feasible for greater smoothing, and N<8 may be used for simplicity or reduced computational time. The distribution may be linear or non-linear (e.g. Gaussian) with distance. An example of a linear expression for an aircraft located at point X, defined as $x_{ac}$, $y_{ac}$, $z_{ac}$ at time t1 is given by:

$$d_{i,j,k,t_1} = \sqrt{(x_{i,j,k} - x_{ac})^2 + (y_{i,j,k} - y_{ac})^2 + (z_{i,j,k} - z_{ac})^2}$$

For the 1 . . . N values of $\min(d_{i,j,k,t_1})$:

$$p_{i,j,k,t_1} = \frac{d_{i,j,k,t_1}}{\sum_1^N d_{i,j,k,t_1}}$$

When repeated for all aircraft detected at that time this will produce an intensity map for time $t_1$. To produce an intensity map of high confidence this process can be repeated for multiple times across a range, for example $t=t_1$ to $t_2$ and averaged:

$$p_{i,j,k} = \frac{\sum_{t=t_1}^{t=t_2} p_{i,j,k,t}}{t_2 - t_1}$$

The information from the intensity map can be used to determine or quantify a probability of an encounter. An encounter may be defined, for example, as being within X km in horizontal distance and Y m (or ft) in altitude from another aircraft.

For a given section of flight, the probability of an encounter may be defined as:

flight time for the section (e.g. in seconds)×flight density (e.g. in number of aircraft per second).

It is noted that other units of time may be used. When aggregated over an entire flight path, this provides the probability of an encounter during the flight.

Figure 3F:
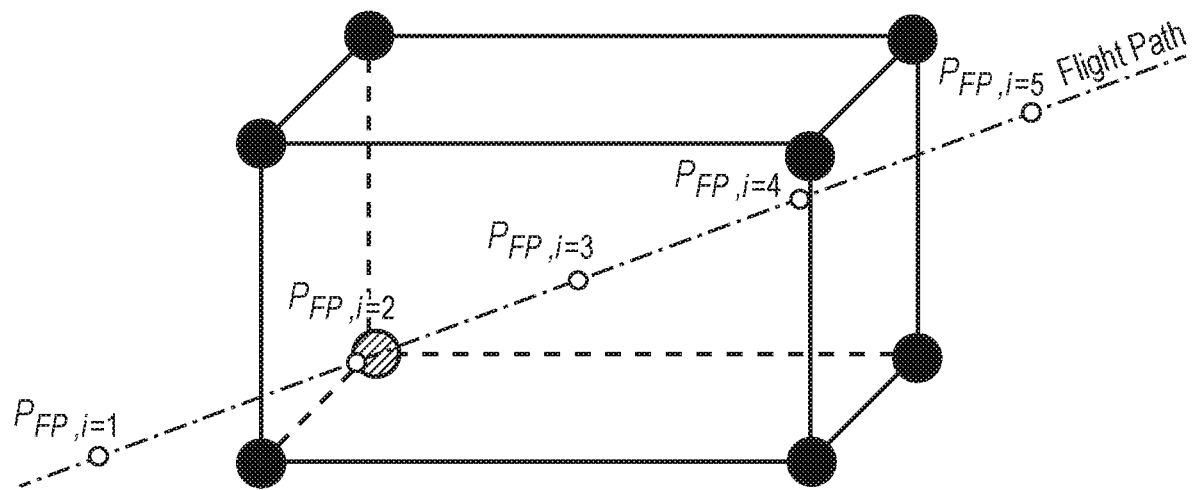
FIG. 3f shows an example of how a probability of encounter may be determined.

FIG. 3f provides an example of how a probability of an encounter may be determined across a flight path (for example having a length D), whereby the flight path is discretised into a series of K elements each of length D/K.

For each of the K elements the local intensity ($p_{FP,i}$) is interpolated from the larger mesh to a point in the centre of the element. This interpolation could be nearest node, linear or non-linear (e.g. cubic). The encounter probability for a particular element will therefore be the local aircraft intensity (typically in aircraft per minute) multiplied by the time taken to cover the element (D/K*1/V where V is the aircraft velocity, for example using minutes). The probability of an encounter for the entire flight path is therefore:

$$p_{FP} = \sum_{i=1}^{K} p_{FP,i} * \frac{D}{KV}$$

Thus, according to one example, determining a probability of encounter comprises partitioning a flight path of length D into a series of K elements, each element of length D/K, and for each of the K elements, interpolating a local intensity ($p_{FP,i}$) from the array of voxels to a point in the centre of the element, and determining the probability of encounter for a particular element based on the local traffic intensity value multiplied by the time taken for the unmanned aircraft system to cover the element. It is noted that for an aircraft having constant velocity, determining the probability of encounter for a particular element may be based on the local traffic intensity value multiplied by the distance of the element K.

In some examples, the length of an element K corresponds to the length of a voxel, while in other embodiments these can differ.

According to another example, determining a probability of encounter may comprise determining if one or more voxels along the flight path comprise a traffic intensity value above a second threshold value. In some embodiments, determining a probability of encounter comprises determining if one or more voxels along the flight path comprise an average traffic intensity value that is above a second threshold value.

Figure 3G:
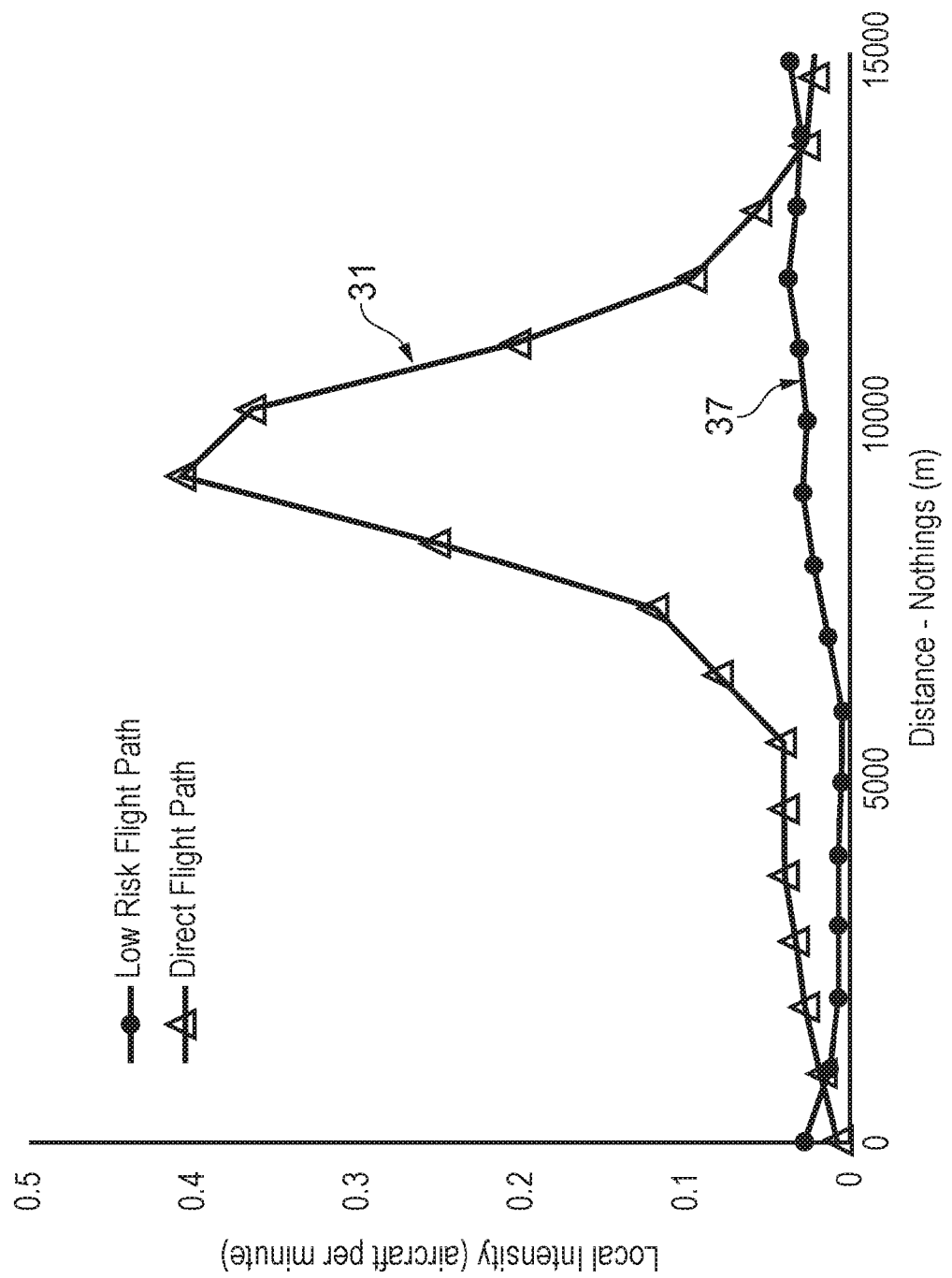
FIG. 3g shows an example of traffic intensity values along a flight path.

FIG. 3g shows an example of traffic intensity values along the direct flight path 31 and the alternative, low risk flight path 37. Thus, is some embodiments the various flight intensity values along the length of the flight path are used to determine a probability of an encounter, with this determined probability of encounter then compared with a first threshold value to determine whether or not the preferred flight path is to be selected.

In another embodiment, the various traffic intensity values along the direct flight path 31 are each compared with a first threshold value, and if one or more of the traffic intensity values are above a first threshold value, then the preferred flight path is not selected. In other words, in such an embodiment the preferred flight path 31 is only selected if all of the traffic intensity values along the flight path are below the first threshold value.

In some examples, selecting an alternative flight path comprises selecting an alternative flight path which avoids one or more voxels having a traffic intensity value above a second threshold value. Put another way, selecting an alternative flight path comprises selecting an alternative flight path via one or more voxels having traffic intensity values below a second threshold value. In some examples selecting an alternative flight path comprises selecting an alternative flight path via one or more voxels having traffic intensity values of zero. Such a flight path can effectively eliminate the likelihood of an encounter.

With such embodiments a flight path can be directed to clear airspace, based on the intensity map which has been compiled from historical flight data.

In some examples, such as the example of FIGS. 3a to 3c, the step of selecting an alternative flight path comprises first attempting to select a flight path having a different altitude in the three dimensional space compared to the preferred flight path. Since unmanned aircraft systems tend to operate at different altitudes to manned aircraft, this can provide a quick way of finding a better alternative flight path, without any significant increase in distance.

As mentioned earlier, in some embodiments an intensity map 21 may comprise terrain data 23. In this way terrain data relating to hills, mountains, buildings and other features can be built into the system by assigning traffic intensity values to voxels in these areas or regions. Therefore, in a similar manner to traffic intensity values from historical aircraft traffic data being used to determine a probability of encounter during a flight path selection, the terrain data can also be taken into account in a similar way. Thus, in such embodiments the intensity map further comprises terrain data. Traffic intensity values for voxels relating to an area comprising terrain may be set, for example, to a traffic intensity value of 100%. In some embodiments, the traffic intensity values for voxels relating to terrain data can be set lower than 100%, for example in a system which his configured to select an alternative path which involves crashing into the ground in preference to crashing into another aircraft, for example in a real-time system where selecting an alternative path involves deciding to crash an unmanned aircraft system into the ground, rather than another aircraft, if no other alternative flight path selections are possible.

In some examples selecting a flight path comprises selecting a flight path having a minimum altitude in the three dimensional space, for example in relation to the terrain data of the intensity map.

Figure 4A:
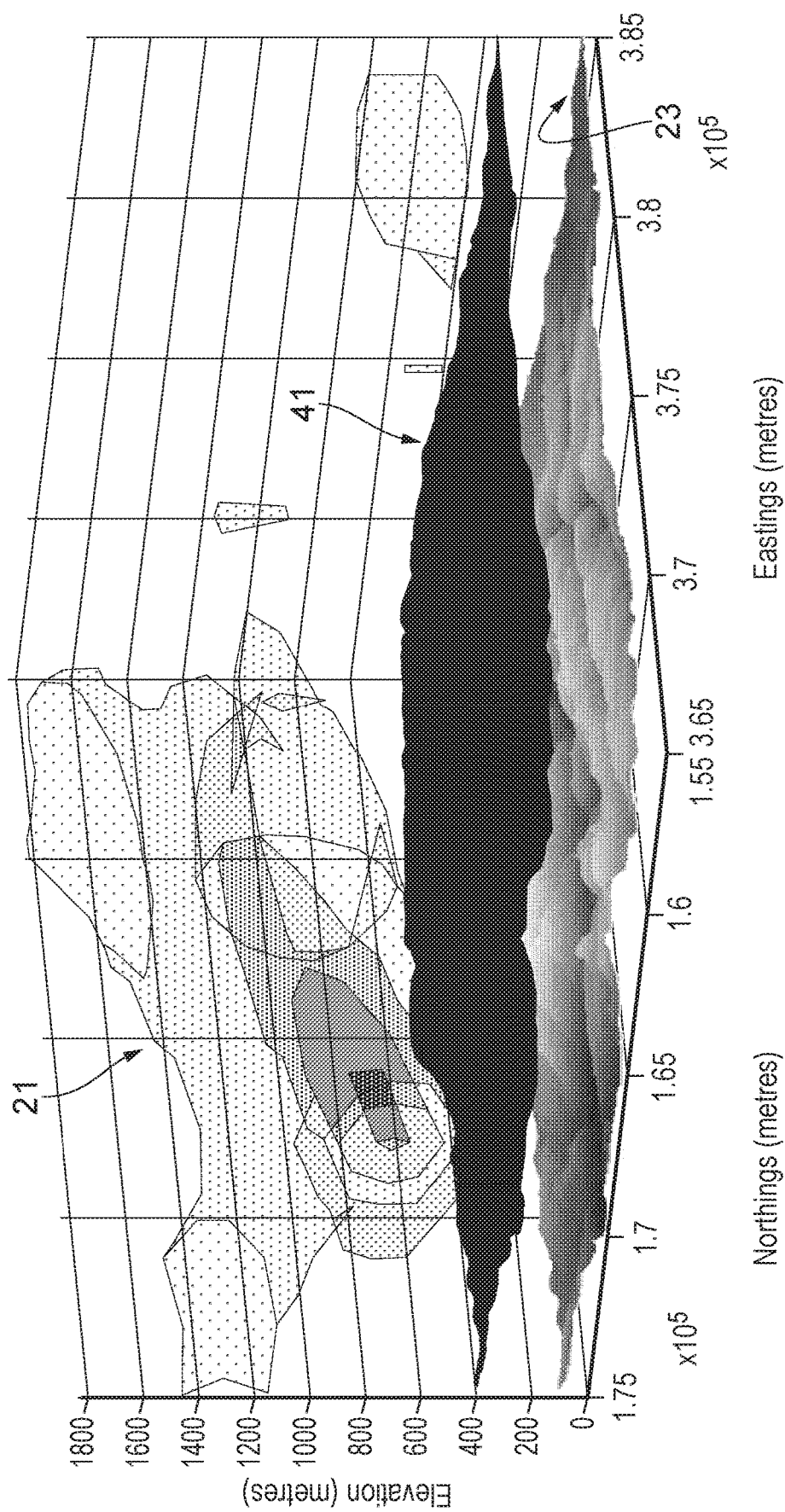
FIGS. 4a to 4c show an example of a flight path selection according to an embodiment.
Figure 4B:
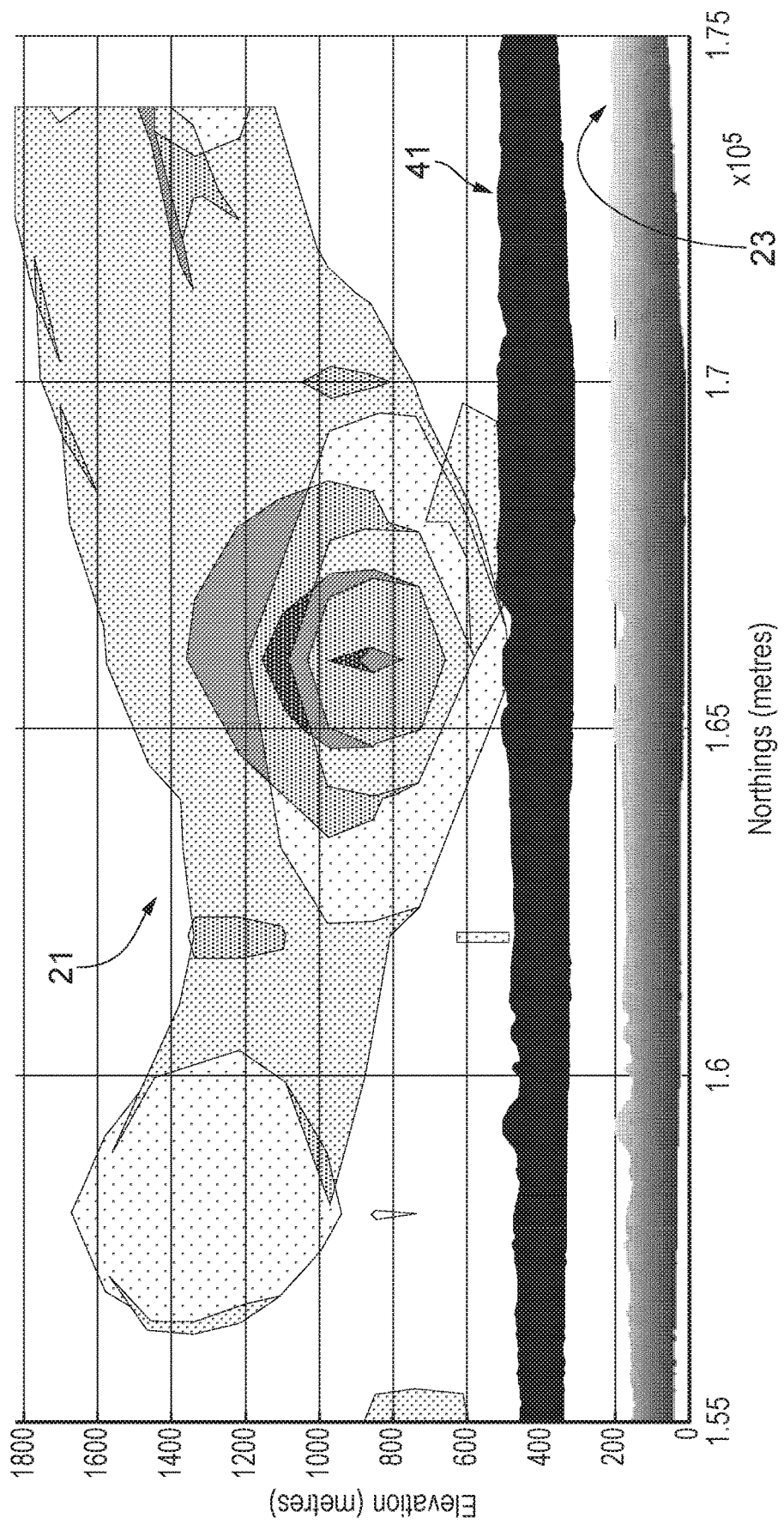
Figure 4C:
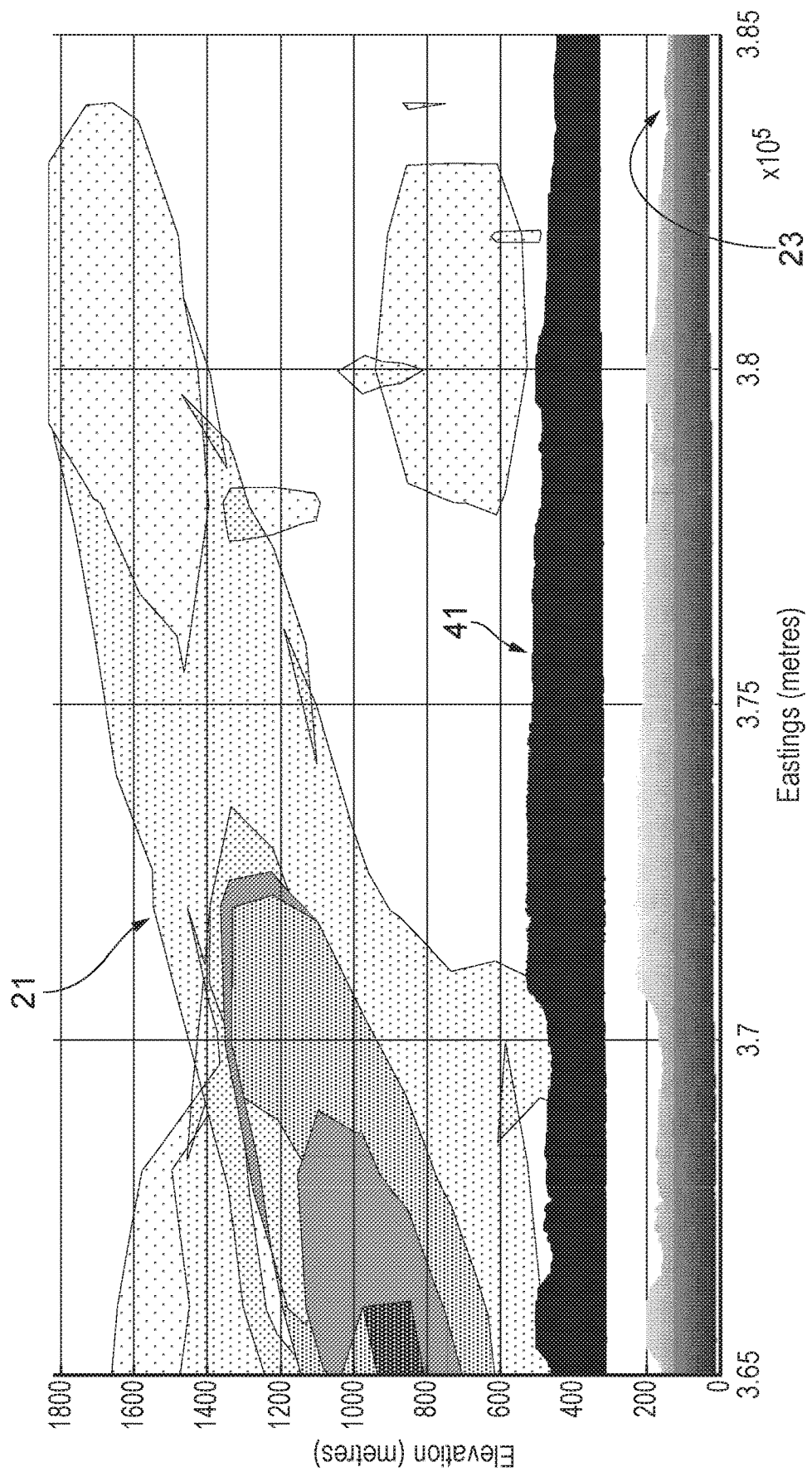

FIGS. 4a to 4c illustrate an example where the intensity map includes a region reflecting a minimum safe altitude 41. This may comprises setting the traffic intensity values to 100% for voxels in this region 41 (as illustrated by the black shading in the grey scale image). This can mirror the terrain data in order to provide the minimum safe altitude over the terrain. In this way, the voxels in the region corresponding to the minimum safe altitude can be used to block a flight path from being directed through (under) that minimum safe altitude.

Figure 5A:
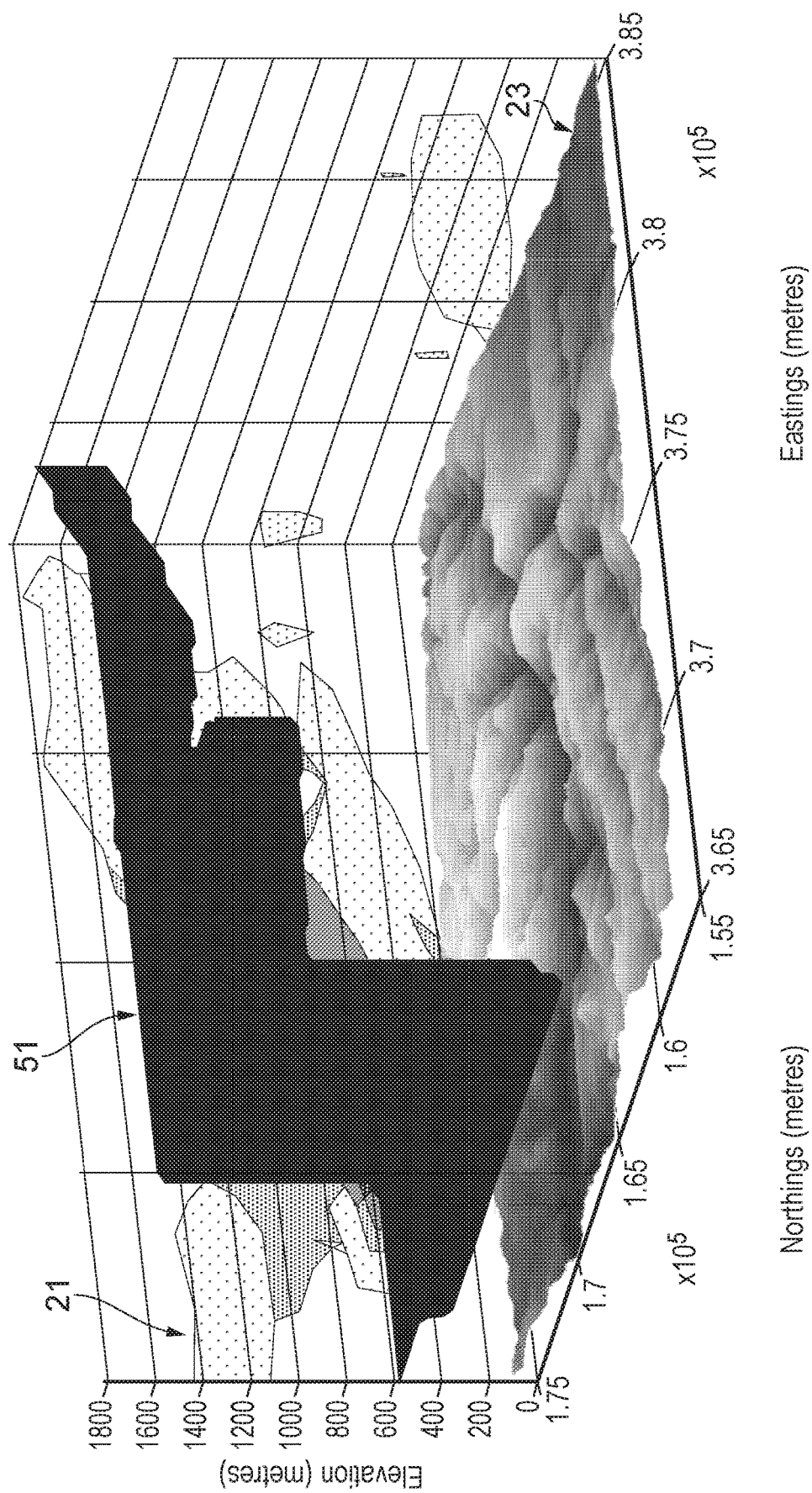
FIGS. 5a to 5c show an example of a flight path selection according to an embodiment.
Figure 5B:
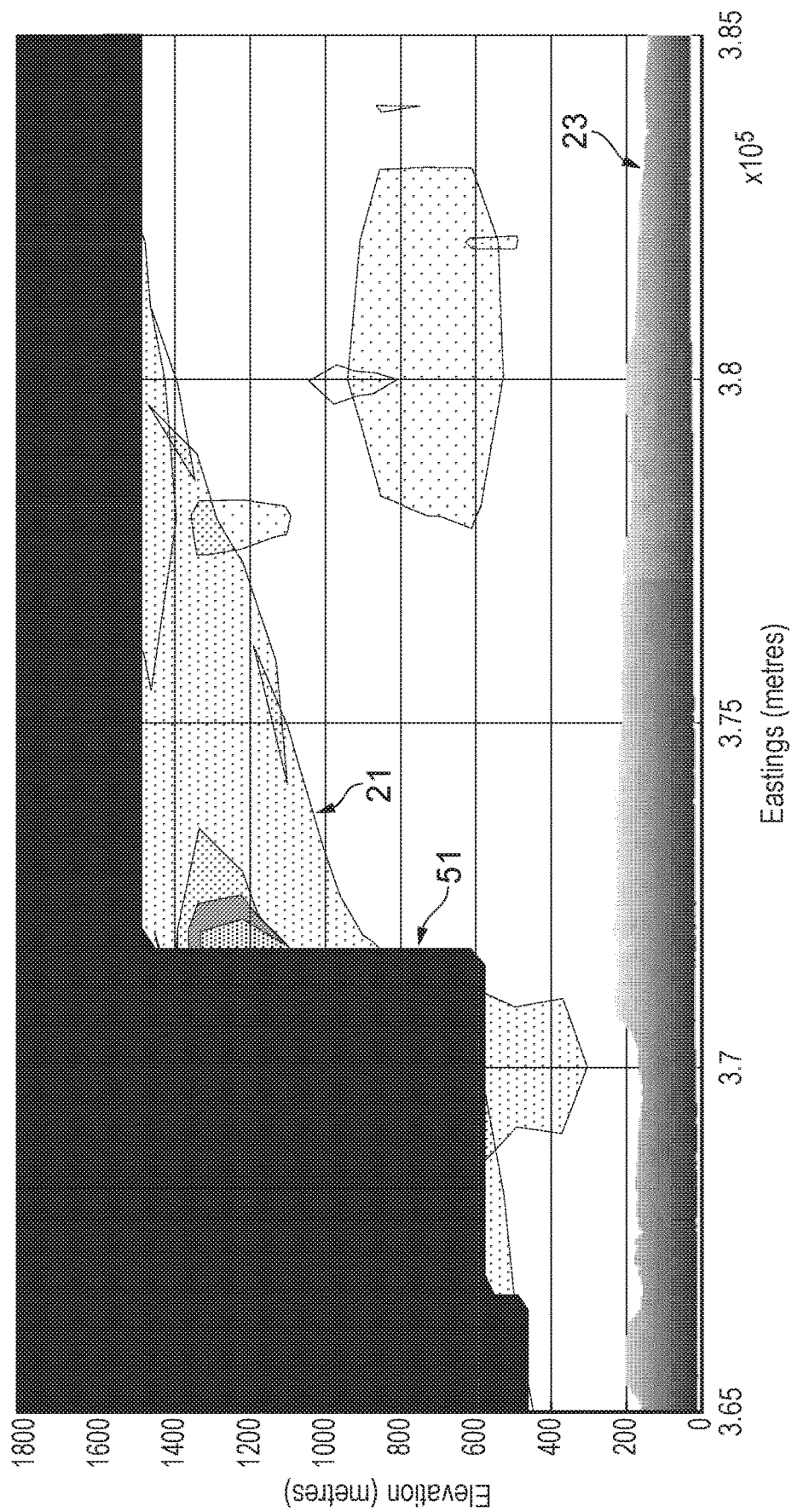
Figure 5C:
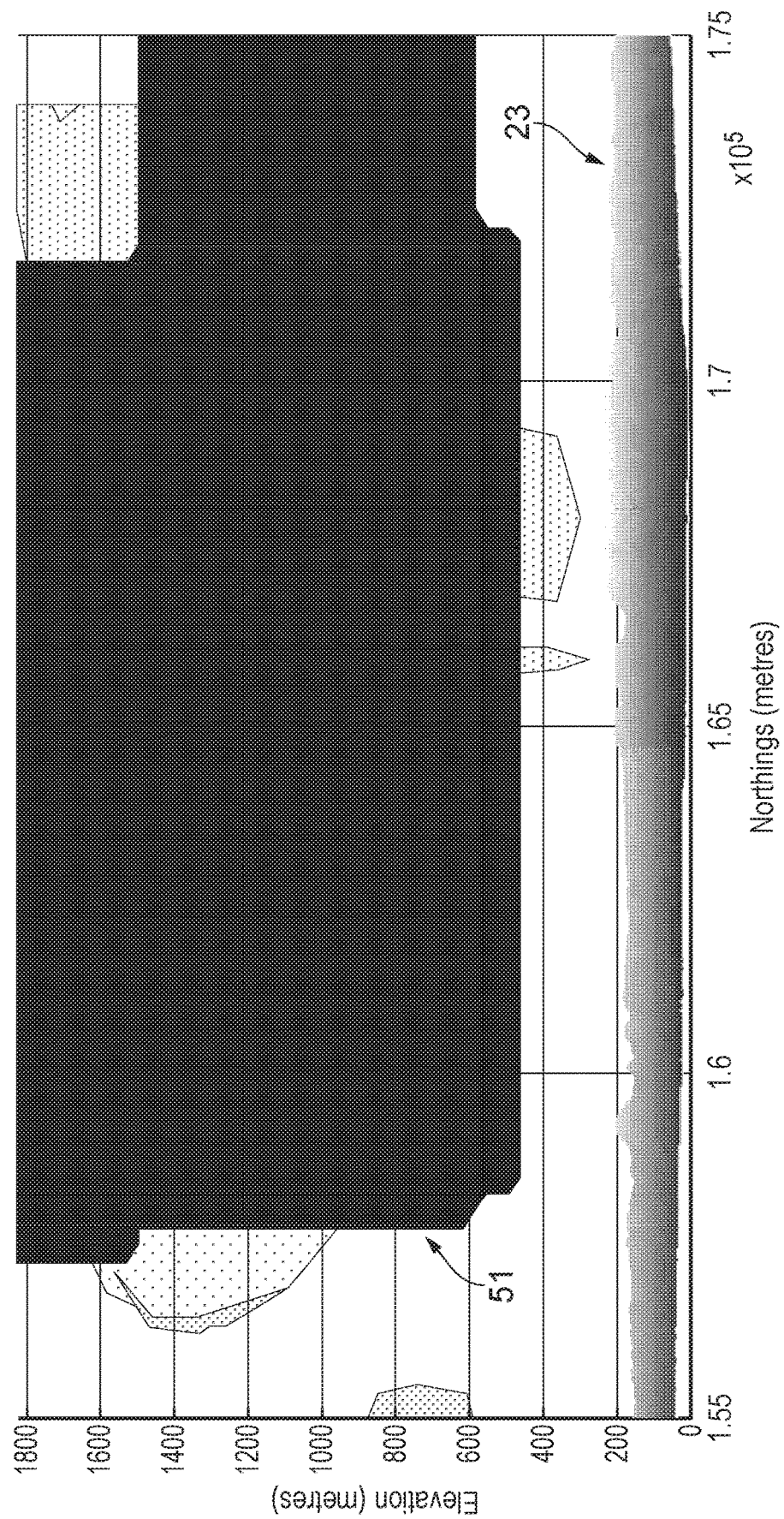

FIGS. 5a to 5c illustrate examples in which an intensity map is further adapted to include restricted or controlled airspace data. FIG. 5a shows an area of restricted airspace 51, corresponding for example to airspace near an airport. FIG. 5b shows a side view from an East side, and FIG. 5c a side view from a North side. In this example, for voxels relating to an area comprising terrain and/or restricted airspace, the traffic intensity values can be set to 100%, for example (as illustrated by the black areas in the grey scale image). In this way, by setting a traffic intensity value of 100%, this ensures that the probability of encounter is above the first threshold value, such that a preferred flight path intending to go through such restricted airspace 51 cannot be selected, such that an alternative flight path is sought around the restricted airspace 51 instead. In some embodiments, traffic intensity values relating to terrain data and/or controlled or restricted airspace can be configured to be porous, for example whereby traffic intensity values ramp up gradually from an edge of the terrain data and/or controlled or restricted airspace with distance from their boundary. Such porous terrain data and/or controlled or restricted airspace may allow an aircraft to contravene a boundary, for example if a threat from a real-time aircraft exceeds the threat from contravening the boundary (i.e. better to fly in restricted airspace than suffer a mid-air collision).

It is noted that such areas of restricted airspace can be set in advance as forming part of the historical data which constitutes the intensity map. It is noted, however, that restricted airspace can also be added dynamically to the intensity map. For example, if there is a sudden need to block unmanned aircraft from entering a certain region of airspace, for example if a large crowd of people is expected under that airspace because of an event, or if rescue aircraft are suddenly expected in that airspace because of an incident, then the intensity map can be adjusted to block unmanned aircraft systems from selecting flight paths that pass through such restricted regions of airspace (e.g. by artificially setting the traffic intensity values of voxels within the restricted airspace to be a certain value, e.g. 100%).

According to another aspect, the characteristics or capabilities of the aircraft system for which the flight path is being determined, for example the unmanned aircraft, can be taken into account when determining a flight path. In one embodiment, selecting a flight path comprises receiving capability data relating to one or more capabilities of the unmanned aircraft system which the flight path is being determined for, whereby the capability data is then used as at least part of the step of selecting the flight path. In this way the selection of the flight path can take into account UAS capabilities such as maximum climb, decent, roll rate etc. For example, if a particular UAS is capable of climbing quickly, then an alternative flight path having a steep climb can be selected to avoid an area of high traffic intensity, whereas if a UAS is not capable of climbing quickly, then an alternative flight path laterally around an area of high traffic intensity may be selected instead, and/or an alternative flight path having a less steep climb.

In a similar manner, according to another aspect a population density may be taken into consideration when determining a flight path. In such an embodiment, selecting an alternative flight path may comprise receiving population density data relating to the population density under a voxel, and using the population density data as at least part of the step of selecting the alternative flight path. In this way the selection of the flight path can take into account population density data when selecting a flight path.

It is noted that the first and second threshold values described above may be set according to specific applications, and may also be changed or altered, including for example dynamically in response to other varying factors, e.g. weather conditions.

In some examples, the first threshold value and/or second threshold value can be set in relation to the type of aircraft system, e.g. UAS, a flight path is being determined for. For example, the criteria for selecting a flight path can be set more strictly for larger UASs which are more likely to cause damage to other aircraft. In this way the first threshold value for a large UAS may be set higher than a first threshold value for a smaller UASs.

The first threshold level and/or second threshold value may also be linked to a collision capability of the aircraft system or UAS whose flight path is being determined. It is likely that UASs are likely to carry collision avoidance systems, for example for aircraft that are not fitted with ADS-B or transponders. During flight these collision avoidance sensors may require the UAS to deviate from its pre-determined minimum risk path due to a collision avoidance manoeuvre, for example due to meteorological conditions or a change in flight plan. This deviation could significantly increase the probability of a collision due to the sensitivity to altitude of flight intensity. However, by continuously updating the route of minimum risk this ensures that the aircraft continues to follow the best possible route.

According to some embodiments, if a UAS has a sophisticated collision avoidance system, then the first threshold level of the probability of encounter can be increased when determining a flight path for such a UAS. In other words, if the UAS has a complex collision avoidance system, then more risk can be taken when selecting a flight path, because if a possibility of a collision is determined during the flight itself, then the UAS can take avoiding action. Conversely, if a UAS has a less sophisticated collision avoidance system, then the first threshold level of the probability of encounter can be decreased when determining a flight path for such a UAS. In this way a route can be adapted to include collision avoidance capabilities of the UAS.

The first threshold level and/or second threshold level can therefore be set to be inversely proportional to the capability level or collision avoidance level of the unmanned aircraft system whose flight path is being controlled.

Just as the capabilities of a UAS may be taken into consideration when determining a flight path, according to another aspect the capabilities of an operator of a UAS may also be taken into consideration. In such embodiments the first threshold value and/or second threshold value can be set in relation to an experience level of an operator of the unmanned aircraft system whose flight path is being determined.

Next there will be described in further detail how an intensity map may be generated. It is noted that an intensity map may be generated in a central control or supervisory node, for example which may then be downloaded or transmitted to smaller control nodes, or indeed to individual UASs. Alternatively, an intensity map may be generated at a local level, including for example by the UAS itself.

In some examples generating an intensity map comprises receiving transponder signals and/or automatic dependent surveillance-broadcast, ADS-B, signals and/or other flight position information from aircraft travelling through the three dimensional space over a period of time, and/or from other sources. Traffic intensity values are then generated for the plurality of voxels within the three dimensional space using the received transponder signals and/or automatic dependent surveillance-broadcast, ADS-B, signals, and/or other flight position information, for example as described in FIGS. 3d and 3e earlier.

It is noted that the transponder/ADS-B/position signals may be received from both manned and unmanned aircraft, such that other UASs carrying transponders can also be used to affect the traffic intensity. Data may also be received from other ground-based sources such as: Multi-Lateration or internet sources (compiling ATC primary/secondary radar, ADS-B and multi-lat to produce a single source). The data received in transponder signals may vary according to a particular application. For example, a Mode A transponder may transmit just a 4-digit squawk code. It is noted that some secondary systems are able to then extract direction/range information based on this signal. A Mode C transponder may transmit as above, plus pressure altitude information. A Mode S transponder may transmit as above, plus a 24-bit "address" that identifies the aircraft.

The signals above may be transmitted from an aircraft in response to interrogations from, for example, an air traffic controller (ATC) or a traffic collision avoidance system (TCAS), e.g. on large aircraft, but can then be detected passively by any aircraft or ground station that is suitably enabled.

Examples of periodic signals are Mode S Extended Squitter and ADS-B, which transmit information including: identification, current position, altitude and velocity.

As mentioned above, in some examples a traffic intensity value for a voxel comprises determining a number of aircraft that have passed through the voxel over a period of time. In other examples, such as described in FIGS. 3d and 3e above, determining a traffic intensity value may be more complex.

In some embodiments the step of generating a traffic intensity value further comprises weighting the received transponder signals and/or ADS-B signals and/or flight position information according to the type of aircraft associated with the respective transponder signal and/or ADS-B signal and/or flight position information. For example, since not all gliders carry transponders, a transponder signal from a glider can be used to increase a traffic intensity value to reflect the fact that there is a likelihood that other gliders might have travelled through that voxel too during the gathering of historical data, which were not carrying transponders.

In some examples the step of generating a traffic intensity value for a voxel comprises receiving population density data relating to the population density in an area under the voxel, and weighting the traffic intensity value according to the population density data. In this way, instead (or as an alternative) to using population density data at a later stage of the flight path determination process, the traffic intensity values can instead be weighted to reflect the population density in the area relating to that voxel, for example so that the traffic intensity value is in turn increased to try and avoid a flight path being chosen over highly populated areas, i.e. because the risk of encounter is also increased.

In the embodiments described herein each voxel can define a section of a flight path. As mentioned earlier the array or mesh of voxels can have the same shape and/or size, or at least one voxel can have a different shape and/or size. In addition, it is noted that different regions within the three dimensional space can have voxels of different shape and/or size. In this way the granularity can be increased in certain areas, for example areas having higher traffic intensity, to thus provide a more refined control in these areas.

The embodiments described above have been based on an intensity map which is effectively static in time, or which is periodically updated, to reflect historical flight data. In such an embodiment a particular voxel may comprise a single traffic intensity value based on the historical flight data, and whereby this single value is periodically updated.

According to another aspect, an intensity map may comprise a plurality of time slices, each time slice comprising traffic intensity values for each of the voxels in the array for that time slice. For example, the intensity map may be time sliced according to minutes in a day, and days in a week. As such, analysing the intensity map relating to the three dimensional space may comprise analysing the intensity map of one or more time slices relating to a time period during which the flight path is being determined for.

For example, if a flight path is being determined for a given space at a particular time of day, for a particular day of the week, then a corresponding time slice (or time slices) for the same time of day, and day of the week, may be used when determining the probability of an encounter. Other possible variables for time slices include, for example, weather conditions, daily/weekly/monthly variations, seasonal (e.g. peak use around Christmas or national holidays), special events (e.g. air shows etc.).

In such embodiments, voxels in the array of voxels can comprise a series of traffic intensity values relating to a series of time slices.

In any of the embodiments described herein, it is noted that the traffic intensity values may be updated periodically. In other examples, it is noted that the traffic intensity values may be updated in real time.

Figure 6A:
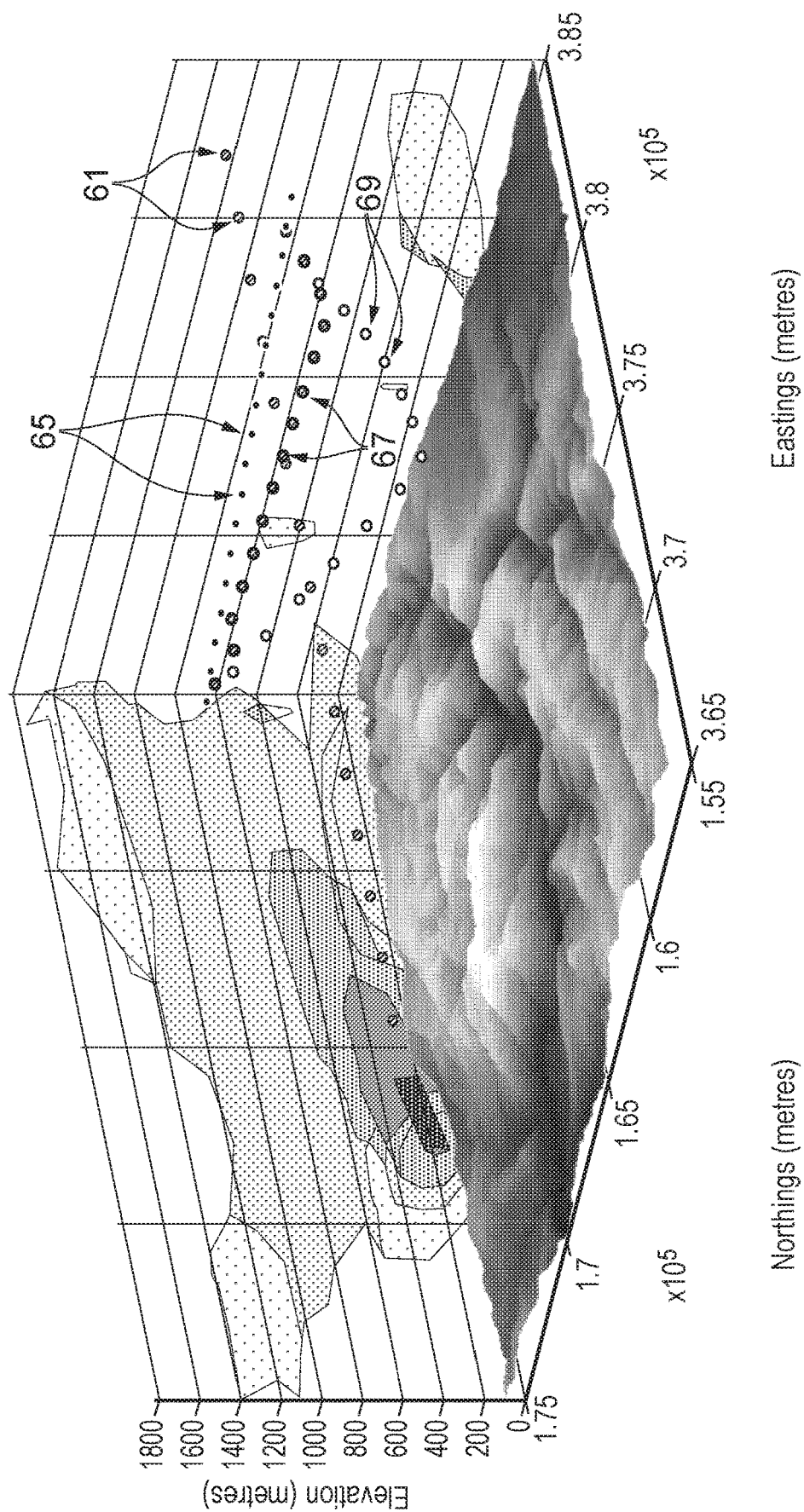
FIGS. 6a to 6c show an example of a flight path selection according to an embodiment.
Figure 6B:
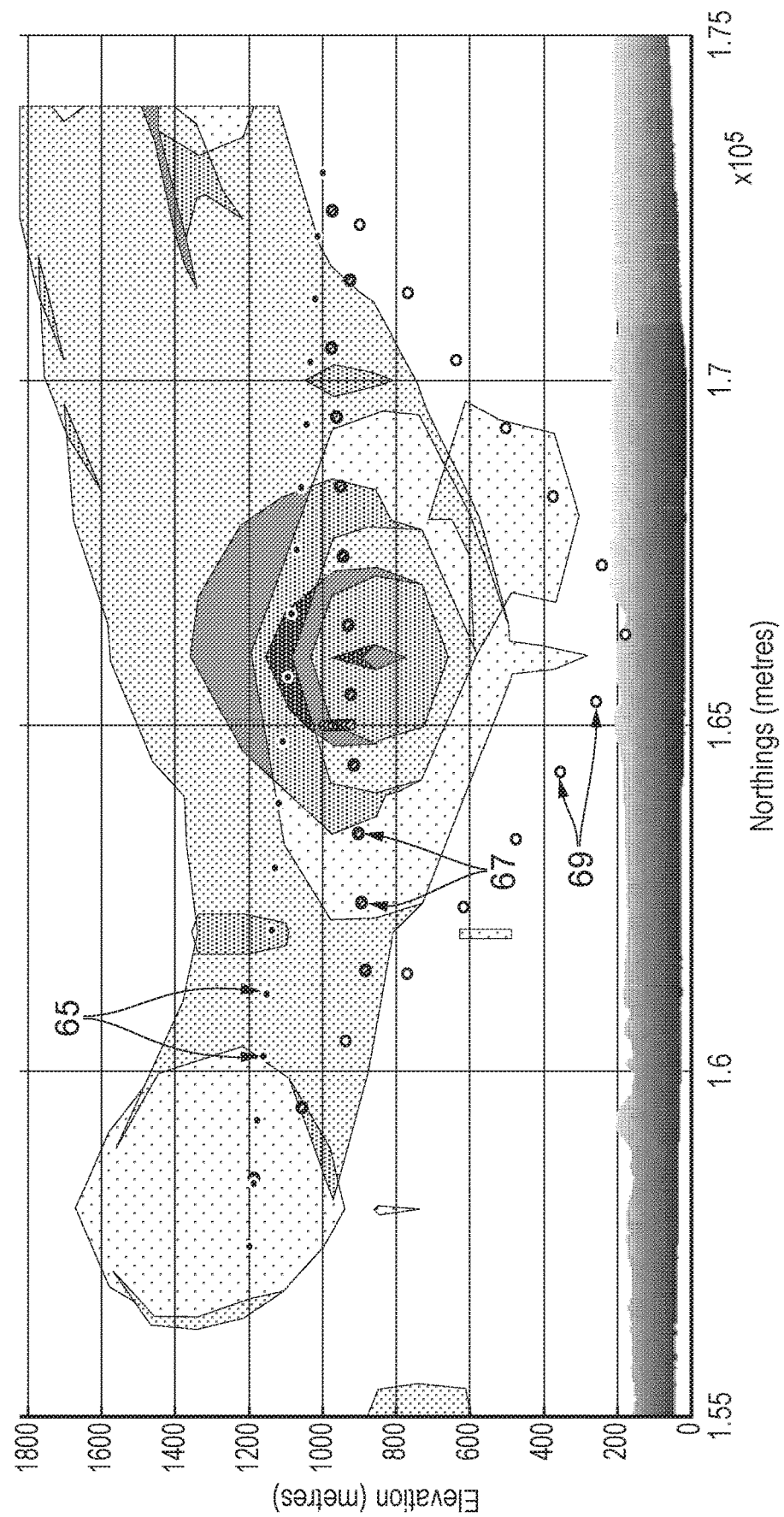
Figure 6C:
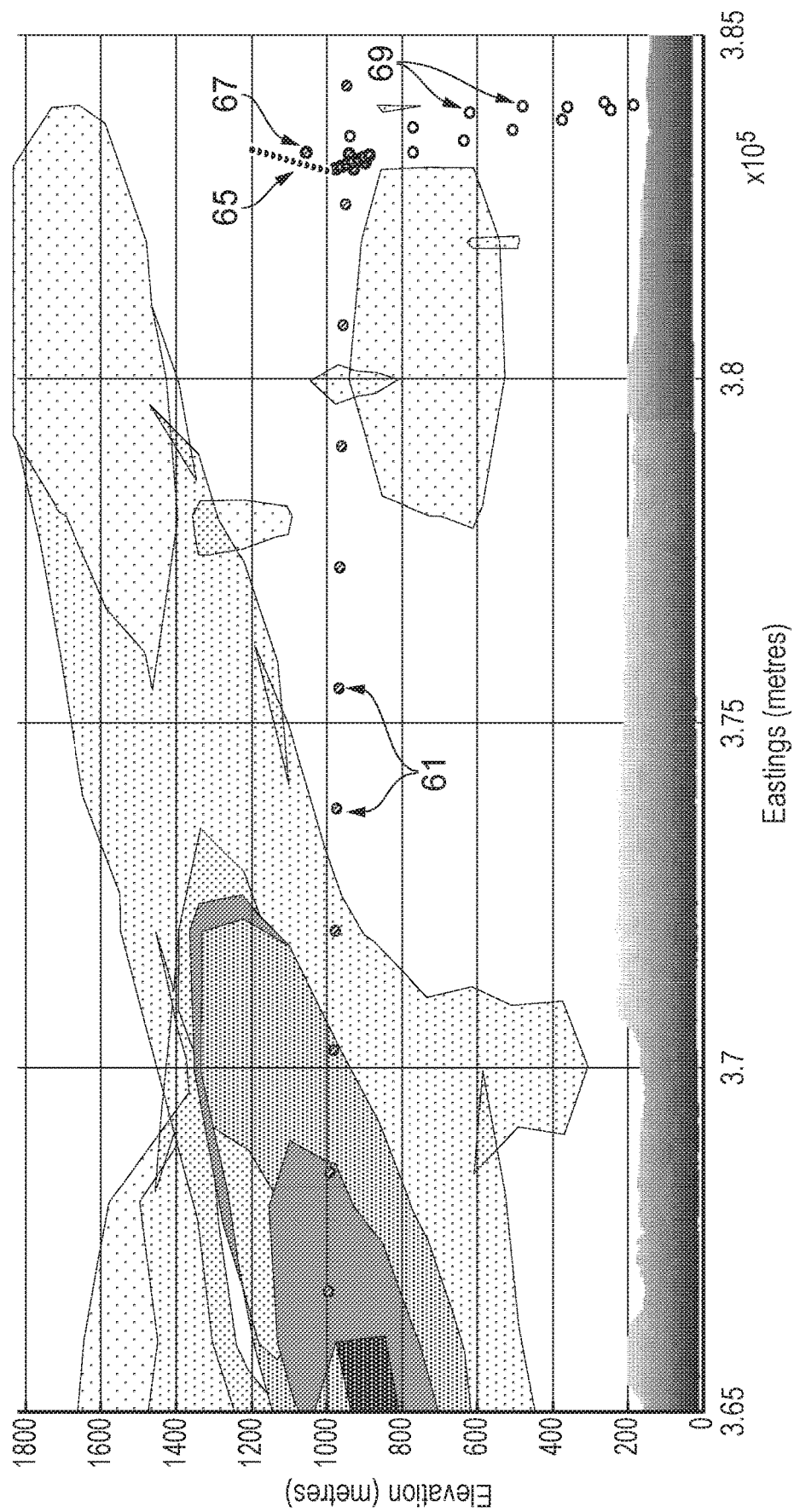

FIGS. 6a to 6c relate to an embodiment in which the simulation of an encounter is made in real time, for example to deal with a real time intruder aircraft.

In FIG. 6a the flight path of the intruder aircraft is shown using dotted lines, some of which are labeled 61. The intruder aircraft (not shown) may be represented, for example, by a 3D oval with 100% intensity at its centre, decaying non-linearly outwards. The shape of the oval is deformed along the axis of the velocity vector of the intruder aircraft as this region has the highest probability of an encounter.

In some examples the shape of the representation of the intruder aircraft can be based on the use of historic data from real aircraft. This enables a spatial probability to be derived from real aircraft behaviour. This spatial distribution can then be expanded according to the intruder aircraft's velocity.

In FIG. 6a a preferred flight path, for example a direct flight path, by the UAS is represented by solid black symbols, some of which are labelled 65.

A first alternative path, for example using historical flight data to find an alternative low risk path as described in embodiments above is shown as black symbols with a cross, some of which are labelled 67.

A second alternative path, for example using a real time low risk path according to another embodiment, comprises a path shown as black circles with white inners, some of which are labelled 69.

FIGS. 6b and 6c show side views from the North side and East side, respectively, of the same flight paths.

As can be seen from FIGS. 6a to 6c, the difference in incorporating real time data is visible by comparing the first alternative path 67 with the second alternative path 69. With the latter, the flight path for the UAS detours along the path of least resistance to go underneath the intruder aircraft (which is best illustrated in FIG. 6b).

Thus, in the embodiments described herein, the method for determining a flight path can run both in pre-flight (for example to determine one or more waypoints which can then be loaded onto a UAS flight controller) and also in real time (either on-board the UAS or on a ground control station). An advantage of real time mission planning is that the flight path planning can respond to developing hazards. Thus, an intruder aircraft can be represented as a moving type of restricted airspace, with voxels relating to that moving type of restricted airspace having traffic intensity values of, for example, 100% that move through the three dimensional space.

With the real time data, both the pre-flight mission planning and real time flight mission planning can incorporate real time flight data from ADS-B signals, transponder signals or other sources. In pre-flight mode this would identify current regions of high intensity. For real time flight control mode this would continuously update the risk of a collision with the real aircraft against the risk of deviating from its minimum risk path. Effectively the real aircraft acts as a "repulsor", in a form of a moving flight traffic intensity object that distorts the flight intensity field, pushing or urging the course of the UAS away from its originally planned flight path. The greater the risk becomes the stronger the deviation. This approach can form part of a larger scale solution to the problem of traffic separation in uncontrolled airspace.

The real time mode can feasibly be run on either a UAS itself, or on a separate flight control system, such as a ground control station. A determining factor in this choice could be the source of real time flight information (i.e. depending upon whether this information is internet based, ground sensor based, on-board ADS-B sensor based, etc.).

Next, there will be described embodiments in which a particular flight path is adapted to take account of one or more other aircraft systems, e.g. UASs, which are allocated similar flight paths, for example between similar start points and similar end points, or along flight paths which have at least a section of flight path in common.

In such an embodiment, selecting a flight path or an alternative flight path may comprise defining a flight corridor through which the unmanned aircraft system is to travel.

Figure 7A:
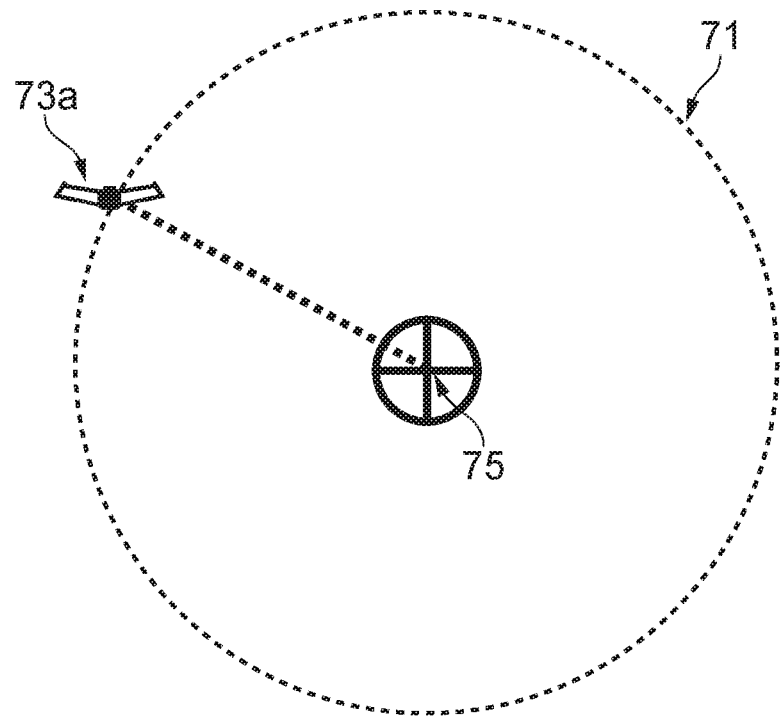
FIGS. 7a to 7e relate to another embodiment.

FIG. 7a shows an example of a cross-section though a flight corridor 71. In this example the flight corridor 71 has a circular cross-section, but it is noted that any shape cross-section can be used. FIG. 7a shows a first UAS 73a being allocated a flight path near the perimeter of the flight corridor. The center of the flight corridor 75 may be considered as an "ideal" flight path. In some examples the first UAS may be allocated to a flight path along the center 75 of the flight corridor 71, rather than the perimeter as shown.

According to this embodiment, a first UAS 73a to be allocated a flight path in the flight corridor 71 is set to travel along a first channel within the flight corridor (the channel being the flight path into the page).

Figure 7B:
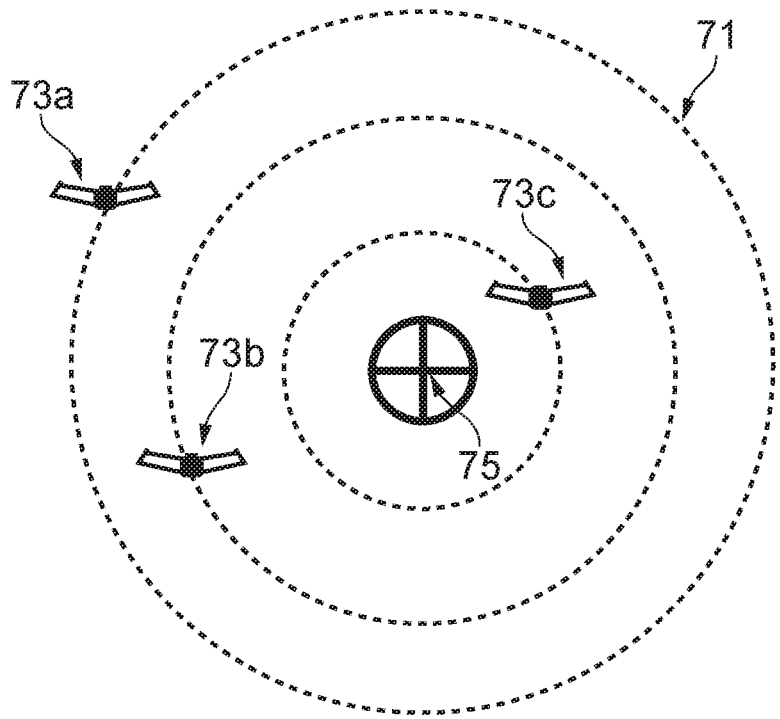

Referring to FIG. 7b, a second UAS 73b to be allocated a flight path in the flight corridor 71 is set to travel along a second channel within the flight corridor, the second channel being physically separate from the first channel. Likewise, a third UAS 73c to be allocated a flight path in the flight corridor 71 is set to travel along a third channel within the flight corridor, the third channel being physically separate from the first and second channels. By using a flight corridor 71, a certain distance can be set around each UAS given that flight path (or section of flight path), these being around the "ideal flight path" allocated to the first UAS.

Figure 7C:
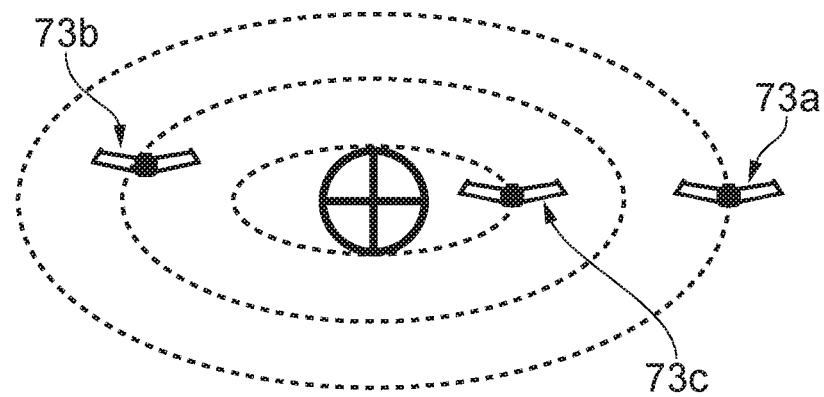
Figure 7D:
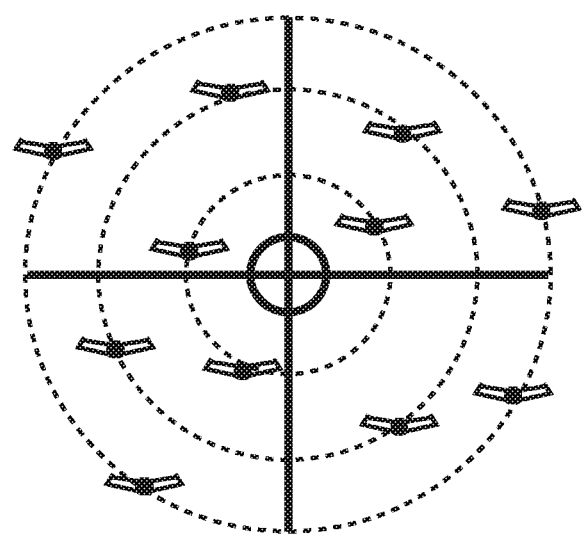
Figure 7E:
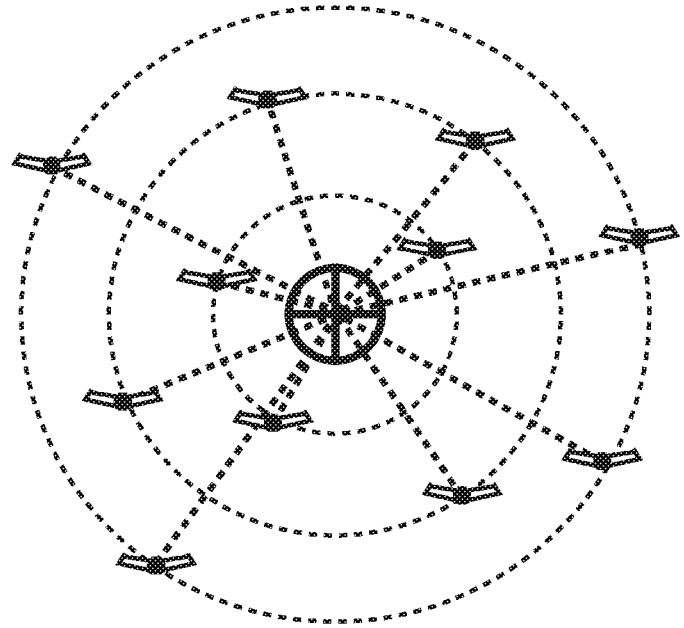

FIGS. 7c, 7d and 7e show further examples in which additional UASs are shown within the same flight corridor 71. In particular, FIG. 7c shows how the shape of the flight corridor can be changed, for example to suit airspace or weather conditions. FIG. 7d shows how the flight corridor is partitioned into sectors, in this example quadrants.

From the above it can be seen that the methods described herein can be used to determine flight paths for multiple UASs along similar routes.

Figure 8:
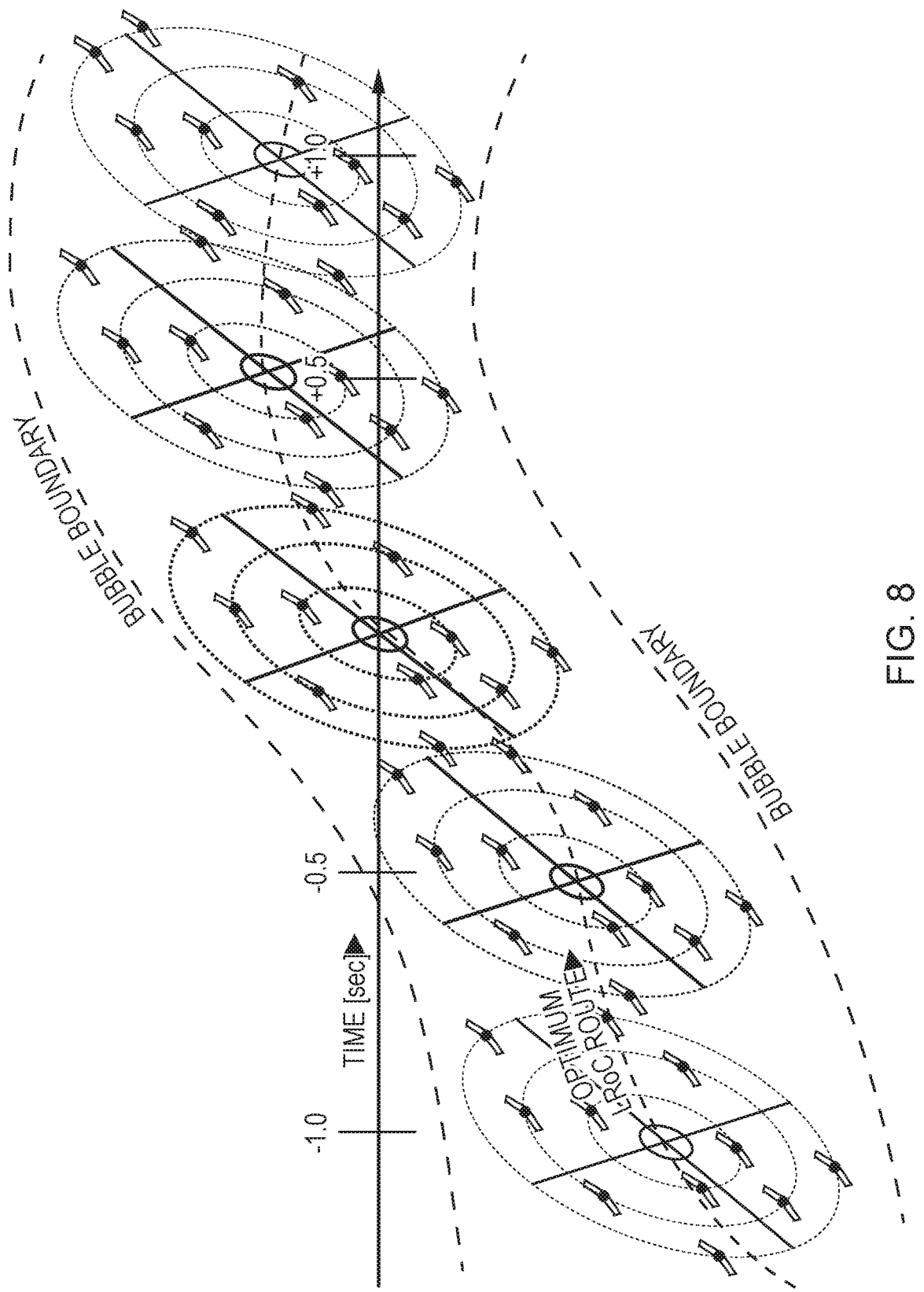
FIG. 8 shows an example of an application of the embodiment of FIGS. 7a to 7e.

FIG. 8 shows an example of UASs travelling down a flight corridor, with individual UASs spaced apart from one another as described above.

Figure 9:
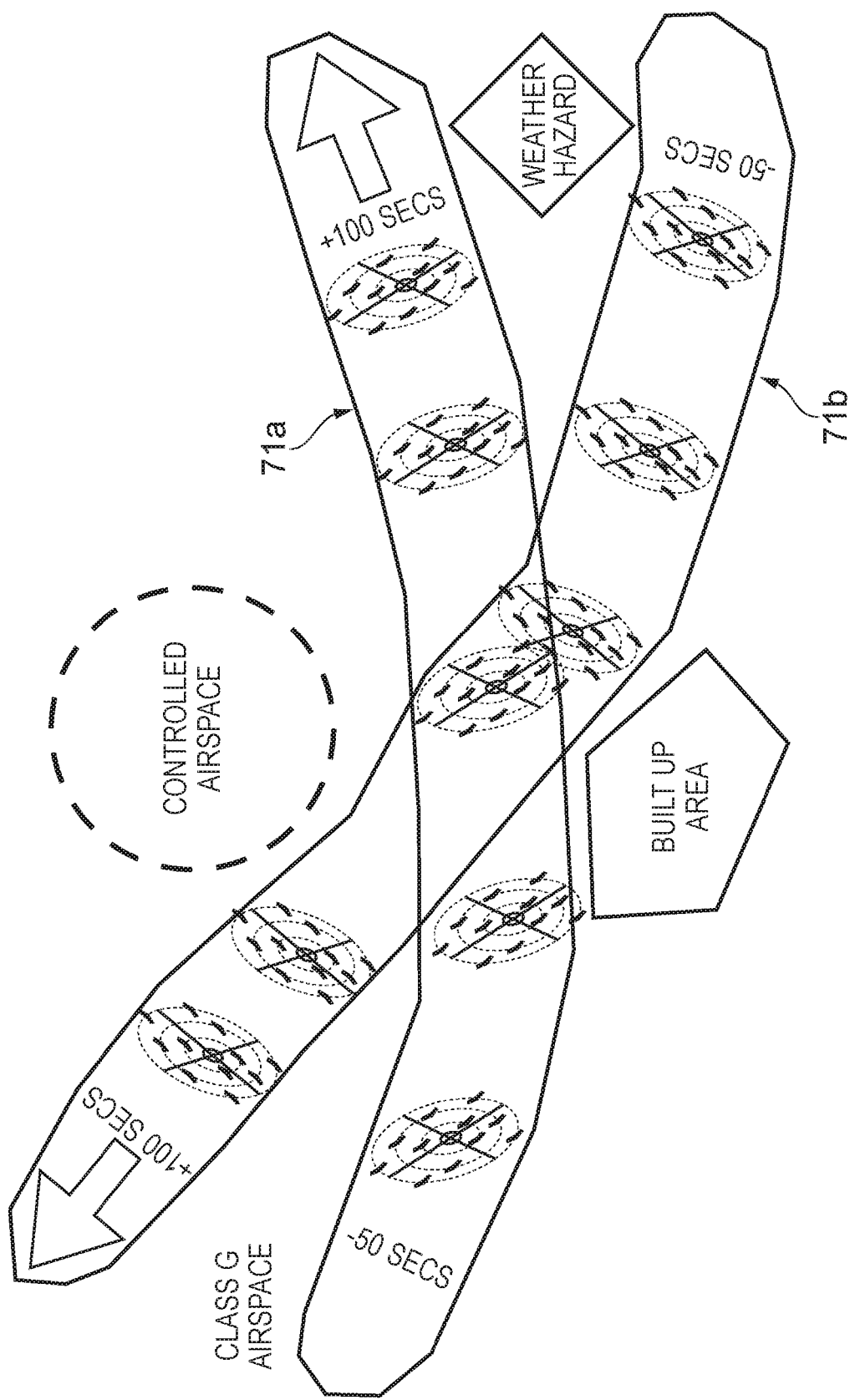
FIG. 9 shows another example of an application of the embodiment of FIGS. 7a to 7e.

FIG. 9 shows an example whereby different corridors 71a and 71b are used to pass UASs in different directions, thereby reducing the risk of UASs colliding with one another. The different corridors 71a, 71b may be set at different altitudes to reduce the risk of collision further.

Although the embodiments above have been described at an operator level, it is noted that, as BVLOS operations grow in popularity, this "low intensity" airspace used by the present embodiments may itself become populated with UAS operators.

The embodiments described herein may therefore be extended to include coordinator input/output functionality to facilitate the coordination of multiple operators. This coordination can make use of real time position and start/finish waypoints for all aircraft. If a potential encounter is identified, such a potential encounter can then calculate a global solution that minimises risk for all aircraft. Furthermore, flight path selection data may be shared between operators, such that real time information can be used to help select future flight path selections.

Figure 10:
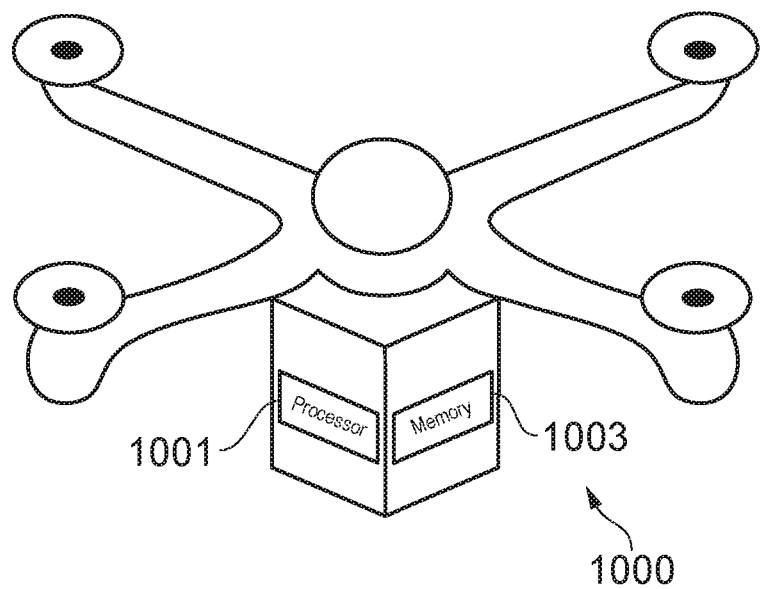
FIG. 10 shows an example of an unmanned aircraft system according to an embodiment.

FIG. 10 shows an example of an aircraft system 1000, for example an unmanned aircraft system, according to an embodiment. The aircraft system 1000 comprises a processor 1001 and a memory 1003, said memory 1003 containing instructions executable by said processor 1003. The aircraft system 1000 is operative to: analyse an intensity map relating to a three dimensional space, wherein the intensity map comprises an array of voxels, each voxel defining a volume in the three dimensional space, and each voxel having a related traffic intensity value based on historical flight data through that voxel; determine a probability of an encounter for a preferred flight path between a start point and an end point via one or more voxels in the three dimensional space, based on traffic intensity values of the one or more voxels along the preferred flight path; and select the preferred flight path if the probability of encounter is less than a first threshold value.

The aircraft system 1000 may also be operative to perform the method as defined in other embodiments described above. In some embodiments, the aircraft system 1000 is configured to determine flight path information itself, for example based on historical flight data and/or real time flight data, and control operation of the aircraft system 1000 accordingly.

According to another example, rather than determining a flight path itself, an aircraft system 1000 may be configured to receive a flight path as determined in accordance with any of the embodiments described herein, for example from a remote control center or flight control system (some or all of which may be cloud based), wherein the processor 1001 of the aircraft system 1000 is configured to control its fight path according to the received flight path information.

Figure 11:
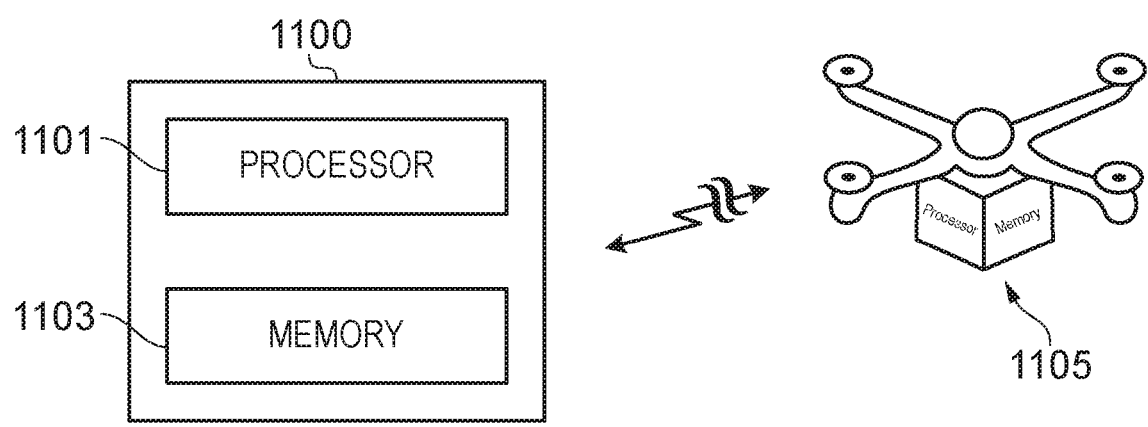
FIG. 11 shows an example of a system for determining a flight path for an unmanned aircraft system according to an embodiment.

FIG. 11 shows an example of a flight control system 1100 according to another embodiment, for controlling an aircraft system 1105, for example an unmanned aircraft system. The flight control system 1100 comprises a processor 1101 and a memory 1103, said memory 1103 containing instructions executable by said processor 1101. The flight control system 1100 is operative to: analyse an intensity map relating to a three dimensional space, wherein the intensity map comprises an array of voxels, each voxel defining a volume in the three dimensional space, and each voxel having a related traffic intensity value based on historical flight data through that voxel; determine a probability of an encounter for a preferred flight path between a start point and an end point via one or more voxels in the three dimensional space, based on traffic intensity values of the one or more voxels along the preferred flight path; and select the preferred flight path if the probability of encounter is less than a first threshold value.

The selected flight path may then be transmitted to an aircraft system 1105, e.g. UAS.

The flight control system 1100 may be operative to perform the method as defined in other embodiments described herein for determining a flight path.

It is noted that in the flight control system 1100, the processing by the processor 1101 may comprise processing on a ground station (e.g. located on-site at a traffic control location), or processing at a remote server (e.g. a cloud based server), or a combination of both.

From the embodiments described above it can be seen that aggregated flight data, for example acquired through transponder and/or ADS-B signals and/or other flight position information, is used to compile a three-dimensional map of flight intensity (traffic density). It is noted that an intensity map may be generated in other ways, for example whereby data is received from another source to help generate the intensity map, for example from a radar system that is configured to determine traffic information, either historical and/or real time. In this way radar information can be used in conjunction with the above described techniques, or instead of, for generating an intensity map.

For ease of manipulation the flight data from many days, or months or years is interpolated onto a regular discretised grid, where each section of the grid represents a voxel. The more data that is put in, the smoother and more accurate the output can be. In this 3D intensity map, regions of high intensity can be avoided when determining a flight path.

The data in the intensity maps described herein may be corrected or updated on a periodic basis, for example daily, weekly or annual, depending for example upon how flight patterns change.

As has been described, the encounter probability can also be combined with a collision avoidance capability of an aircraft (quantified as a probability of successful avoidance) to quantify the probability of a collision. Such collision probability relates to information that is required by the Civil Aviation Authority to quantitatively assess the suitability of a given UAS operation. For example, a particular aircraft design may have an acceptable level of encounter probability, based on its capability for collision avoidance, such that it can be demonstrated to be safer than a light aircraft.

The embodiments above enable routes of minimum risk to be defined using path planning algorithms. It is noted that there are a range of established algorithms for path planning, per se, any of which can be used with the embodiments herein, but whereby the path planning algorithms are adapted based on minimising the probability of an encounter (which is for example a continuous scale). A shorter route might go through a higher traffic intensity region, whereas a longer route can result in more time exposed to a lower intensity. This compromise can be taken into account in the definition of encounter probability above.

Based on tests using a basic path planning algorithm it is possible to reduce the encounter probability substantially (for example from 50% to 90%) with minimal increase in flight distance (e.g. of the order of 1%). This is partly due to the altitude sensitivity of manned aircraft operations. Once planned the route can be transmitted to the UAS for the UAS to perform.

As seen from above, the minimum risk path planning apparatus can be adapted to further include:

a) Terrain Visualisation—whereby a 3D map of the local terrain is included.

b) Restricted Airspace—whereby it is possible to also incorporate 3D maps of restricted airspace which the mission planner cannot contravene. This could also include daily updated Notice to AirMen (NOTAMs), which are a form of temporary restricted area.

c) Minimum Safe Altitude (MSA)—to allow altitude for emergency manoeuvres/actions and to clear obstacles it is necessary to operate with an MSA with reference to the ground level. This can be relative to a single point (take-off location) and therefore effectively a single Above Mean Sea Level value; or it can be local (the ground is artificially elevated as a boundary) and therefore take account of contours.

d) Aircraft Performance Metrics—if uncontrolled the planning algorithm may choose manoeuvres beyond the aircraft's capability. To take this into account some of the embodiments described herein take into account the capabilities of the UAS, for example the aircraft handling characteristics (e.g. maximum climb/descent/roll rate etc.).

e) Population Density—there is also an element of risk due to flight over populated areas. Some embodiments therefore include local population density as a risk variable (appropriately balanced with the encounter probability) or simply no fly areas over populated space. These may also take into account the glide/parachute descent behaviour of the UAS, including local wind conditions.

From the description above it will be appreciated that the embodiments described herein are based on a realisation that the probability of an unmanned aircraft system having a collision is closely linked to traffic density. The embodiments described above apply historic flight data to produce or visualize 3D maps of mean flight intensity. The maps can then be used to quantify the probability of an encounter, and to calculate routes of minimum encounter probability/risk.

The embodiments described above enable different types of aircraft to operate in different regions of airspace. By identifying these regions, then aircraft systems such as unmanned aircraft systems can be controlled to operate in the unused airspace in between manned aircraft, thereby greatly reducing the probability of an encounter and therefore a collision. The embodiments described herein determine the 3D patterns in which aircraft operate in space, particularly with respect to altitude, thus enabling unmanned aircraft systems to be controlled to avoid spaces which have a high probability of being densely populated by aircraft.

Embodiments described herein can also take advantage of the realisation that different types of aircraft (e.g. glider/light aircraft/civil transport/military/helicopter) primarily collide with aircraft of their own type.

Figure 12:
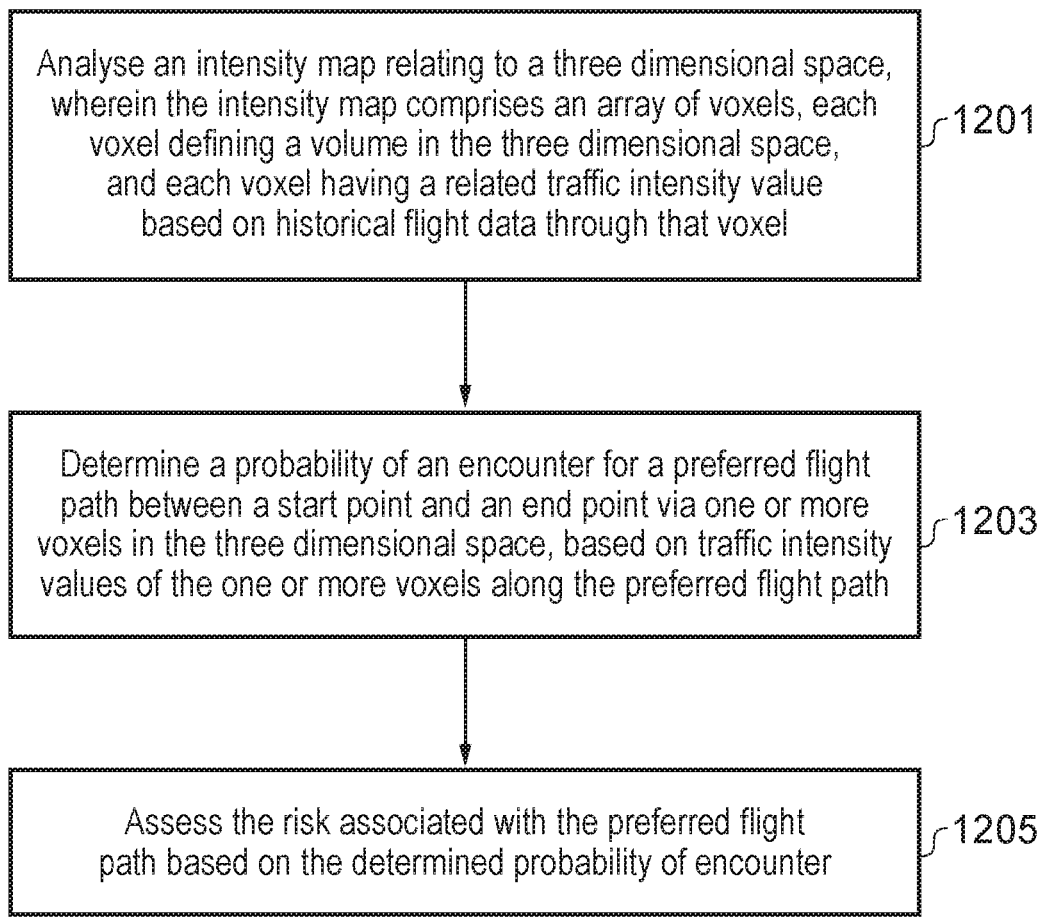
FIG. 12 shows an example of a method according to another aspect, for assessing a risk associated with a flight path for an aircraft system.

FIG. 12 shows an example of a method according to another aspect, for assessing a risk associated with a flight path for an aircraft system. The method comprises analysing an intensity map relating to a three dimensional space, wherein the intensity map comprises an array of voxels, each voxel defining a volume in the three dimensional space, and each voxel having a related traffic intensity value based on historical flight data through that voxel, step 1201. The method comprises determining a probability of an encounter for a preferred flight path between a start point and an end point via one or more voxels in the three dimensional space, based on traffic intensity values of the one or more voxels along the preferred flight path, step 1203. The method comprises assessing the risk associated with the preferred flight path based on the determined probability of encounter, step 1205. Such a method may be used, for example, by an insurer to assess the risk posed by an operator of an aircraft system, so that an insurance quotation and/or permission to fly can be given on the assessed level of risk. The risk assessment may have a sliding scale, for example whereby a higher risk generates a higher insurance quotation. It is noted that the method of FIG. 12 may incorporate any one or more steps from the other methods described above.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method for determining a flight path for an aircraft system, the method comprising:
 analysing an intensity map relating to a three dimensional space, wherein the intensity map comprises an array of voxels, each voxel defining a volume in the three dimensional space, and each voxel having a related traffic intensity value based on historical flight data through that voxel;
 determining a probability of an encounter for a preferred flight path between a start point and an end point via one or more voxels in the three dimensional space, based on traffic intensity values of the one or more voxels along the preferred flight path;
 selecting the preferred flight path if the probability of encounter is less than a first threshold value; and
 guiding an aircraft to travel along the preferred flight path responsive to selecting the preferred flight path.

2. A method as claimed in claim 1 wherein, if the determined probability of encounter is above the first threshold value, selecting an alternative flight path between the start point and the end point.

3. A method as claimed in claim 2, wherein selecting an alternative flight path between the start point and end point comprises:
 comparing the probability of encounter along two or more different flight paths between the start point and end point, via different voxels in the three dimensional space; and
 selecting a flight path which has a probability of encounter lower than the first threshold value.

4. A method as claimed in claim 2, wherein selecting an alternative flight path comprises selecting a shortest flight path which has a probability of encounter lower than the first threshold value.

5. A method as claimed in claim 2, wherein selecting an alternative flight path comprises selecting the flight path which has a lowest overall probability of encounter.

6. A method as claimed in claim 2, wherein selecting an alternative flight path comprises selecting a flight path which has a zero probability of encounter.

7. A method as claimed in claim 1, wherein determining a probability of encounter comprises determining if one or more voxels along the flight path comprise a traffic intensity value above a second threshold value.

8. A method as claimed in claim 1, wherein determining a probability of encounter comprises:
 partitioning a flight path of length D into a series of K elements, each element of length D/K;
 for each of the K elements, interpolating a local intensity ($p_{FP,i}$) from the array of voxels to a point in the centre of the element; and
 determining the probability of encounter for a particular element based on the local traffic intensity value multiplied by the time taken for the aircraft system to cover the element.

9. A method as claimed claim 8, wherein the probability of an encounter for the entire flight path is determined as:

$$p_{FP} = \sum_{i=1}^{K} p_{FP,i} * \frac{D}{KV}$$

where V is the velocity of the aircraft system.

10. A method as claimed in claim 2, wherein selecting an alternative flight path comprises selecting an alternative flight path which avoids one or more voxels having a traffic intensity value above a second threshold value.

11. A method as claimed in claim 2, wherein selecting an alternative flight path comprises first attempting to selecting a flight path having a different altitude in the three dimensional space compared to the preferred flight path, or a flight path having a minimum altitude in the three dimensional space.

12. A method as claimed in claim 1, wherein selecting an alternative flight path comprises:
 receiving population density data relating to the population density under a voxel; and
 using the population density data as at least part of the step of selecting the alternative flight path.

13. A method as claimed in claim 1, further comprising the step of generating the intensity map by:
 receiving transponder signals and/or automatic dependent surveillance-broadcast, ADS-B, signals and/or other flight position information from aircraft travelling through the three dimensional space, and/or from other sources, over a period of time; and
 generating traffic intensity values for the plurality of voxels within the three dimensional space using the received transponder signals and/or automatic dependent surveillance-broadcast, ADS-B, signals and/or other flight position information.

14. A method as claimed in claim 13, wherein generating a traffic intensity value for a voxel comprises determining a number of aircraft that have passed through the voxel over a period of time.

15. A method as claimed in claim 13, wherein a probability value of each aircraft is distributed across the array of voxels according to the distance between an aircraft and nearest N nodes associated with nearest N voxels.

16. A method as claimed in claim 15, wherein the distribution is linear or non-linear with distance.

17. A method as claimed in claim 16, wherein a linear distribution for an aircraft located at point X, defined as $x_{ac}$, $y_{ac}$, $z_{ac}$ at time t1 is given by:

$$d_{i,j,k,t_1} = \sqrt{(x_{i,j,k} - x_{ac})^2 + (y_{i,j,k} - y_{ac})^2 + (z_{i,j,k} - z_{ac})^2}$$

For the 1 ... N values of $\min(d_{i,j,k,t_1})$:

$$p_{i,j,k,t_1} = \frac{d_{i,j,k,t_1}}{\sum_1^N d_{i,j,k,t_1}}.$$

18. A method as claimed in claim 1, wherein:
the intensity map comprises a plurality of time slices, each time slice comprising traffic intensity values for each of the voxels in the array for that time slice; and wherein analysing the intensity map relating to the three dimensional space comprises analysis the intensity map of one or more time slices relating to a time period during which the flight path is being determined.

19. An aircraft system comprising a processor and a memory, said memory containing instructions executable by said processor, whereby said aircraft system is operative to:
analyse an intensity map relating to a three dimensional space, wherein the intensity map comprises an array of voxels, each voxel defining a volume in the three dimensional space, and each voxel having a related traffic intensity value based on historical flight data through that voxel;
determine a probability of an encounter for a preferred flight path between a start point and an end point via one or more voxels in the three dimensional space, based on traffic intensity values of the one or more voxels along the preferred flight path;
select the preferred flight path if the probability of encounter is less than a first threshold value; and
guide an aircraft to travel along the preferred flight path responsive to selecting the preferred flight path.

20. A flight control system for controlling an aircraft system, and comprising a processor and a memory, said memory containing instructions executable by said processor, whereby said flight control system is operative to:
analyse an intensity map relating to a three dimensional space, wherein the intensity map comprises an array of voxels, each voxel defining a volume in the three dimensional space, and each voxel having a related traffic intensity value based on historical flight data through that voxel;
determine a probability of an encounter for a preferred flight path between a start point and an end point via one or more voxels in the three dimensional space, based on traffic intensity values of the one or more voxels along the preferred flight path;
select the preferred flight path if the probability of encounter is less than a first threshold value; and
guide an aircraft to travel along the preferred flight path responsive to selecting the preferred flight path.

* * * * *